(12) United States Patent
Iwamoto

(10) Patent No.: US 6,544,650 B2
(45) Date of Patent: *Apr. 8, 2003

(54) MODELS AND METHODS OF INTEGRATING SIMULATION TECHNIQUES FOR ADVANCED MATERIAL PREDICTIVE ANALYSIS

(75) Inventor: Nancy E. Iwamoto, Ramona, CA (US)

(73) Assignee: Honeywell International Inc., Morristown, NJ (US)

( * ) Notice: Subject to any disclaimer, the term of this patent is extended or adjusted under 35 U.S.C. 154(b) by 79 days.

This patent is subject to a terminal disclaimer.

(21) Appl. No.: 09/726,066

(22) Filed: Nov. 29, 2000

(65) Prior Publication Data

US 2002/0035446 A1 Mar. 21, 2002

Related U.S. Application Data

(63) Continuation-in-part of application No. 09/543,628, filed on Apr. 5, 2000.

(51) Int. Cl.[7] ............................................... B32B 27/38
(52) U.S. Cl. .................... 428/413; 428/422.8; 364/149; 364/150; 364/152; 361/792; 361/793; 361/794
(58) Field of Search .............................. 428/413, 422.8; 364/149, 150, 152; 361/792, 793, 794

(56) References Cited

U.S. PATENT DOCUMENTS 5,959,256 A * 9/1999 Soida ........................ 174/258
6,057,402 A * 5/2000 Zhow et al. ................. 525/122

OTHER PUBLICATIONS

Iwamoto, N. E. "Applying Polymer Process Studies Using Molecular Modeling". Proceedings of the 4th International Conference on Adhesive Joining and Coating Technology in Electronics Manufacturing (Adhesives in Microelectronics 2000) Jun. 18–21, Helsinki, Finland; pp. 182–187.

Iwamoto, N.E. "Advancing Polymer Process Understanding in Package and Board Applications . . . ". Proceedings of the 50th Electronic Components and Technology Conference; May 21–24, 2000; Las Vegas, NV. pp. 1354–1359.

Iwamoto, N.E. "Simulating Stress Reliability Using Molecular Modeling Methodologies". 32nd International Symposium on Microelectronics; Chicago, III; Oct. 26–28, 1999, Proceedings pp. 415–420.

* cited by examiner

Primary Examiner—Leszek Kiliman
(74) Attorney, Agent, or Firm—Rutan & Tucker, LLP; Sandra P. Thompson; Robert D. Fish

(57) ABSTRACT

A method of designing an electronic component comprises: a) modeling a first material with respect to a characteristic of the first material in a sufficient detail to at least partially account for a first value for the characteristic; b) modeling a second material with respect to a characteristic of the second material in a sufficient detail to at least partially account for a second value for the characteristic; c) modeling an interface between the first material and the second material such that in at least some instances the characteristic of the interface does not have an obvious characteristic or obvious value of between the first value and the second value; and d) generating a set of evaluation data from the modeling of the interface. A modeling system is also disclosed comprising: a) a computer; b) an output device operatively coupled to the computer that outputs a set of evaluation data; c) a plurality of sets of controls coupled to the computer; and d) a software code that models a first material with respect to a characteristic of the first material in a sufficient detail to at least partially account for a first value for the characteristic; models a second material with respect to a characteristic of the second material in a sufficient detail to at least partially account for a second value for the characteristic; models an interface between the first material and the second material such that in at least some instances the characteristic of the interface does not have a value of between the first value and the second value; and generates the set of evaluation data from the modeling of the interface, wherein the code is run by the computer and is coupled to the controls and to the video display.

19 Claims, 19 Drawing Sheets

A

B

A

B

MODELS AND METHODS OF INTEGRATING SIMULATION TECHNIQUES FOR ADVANCED MATERIAL PREDICTIVE ANALYSIS

This application is a continuation-in-part of pending U.S. Utility Application No. 09/543,628, filed Apr. 5, 2000 now pending.

FIELD OF THE INVENTION

The field of the invention is electronic devices and components of electronic devices, including electronic packaging materials, and materials involved in electronic packaging structures such as patches, preforms, and printed circuit boards and their materials.

BACKGROUND

Electronic devices and their components, including solder points and other interfaces, packaging materials, and printed circuit board(s), are advantageously designed and engineered to take into account desirable electrical and chemical properties of the resulting device or component and to withstand at least a minimum amount of wear and tear.

Electronic devices and components are generally designed and constructed by investigating the physical, chemical and electrical properties of the available bulk materials and then utilizing those properties in the design of the device or component. Researchers and engineers generally do not investigate or incorporate secondary properties, such as molecular and atomic interactions between various combinations of bulk materials, into the design of the device or component.

Once the component or device is constructed, researchers usually perform a battery of component level testing, including temperature testing, stress testing, and moisture testing in order to test product durability and reliability. At this point in the product design, the researcher or engineer may realize that the bulk materials' properties do not reflect the actual data presented or recorded from the individual bulk material testing.

From the mechanistic standpoint, reliability of a combination of two or more bulk materials can be measured by investigating a combination of elastic, plastic, and viscoelastic behaviors of materials. For example, solder ball/underfill interface failure under may originate from a combination of plastic deformation of the solder ball and viscoelastic flow of the underfill. From that perspective reliability can be thought of as a multiple interfacial interaction with, for example, the solder—solder, polymer—polymer, polymer-solder and the associated stress/strain relationships contributing to the predicted failure.

However, for the chemist looking at combinations of two or more bulk materials, such as that which is at polymer-involved interfaces, the determination of failure is not that simple. Failure can occur both on a relatively large level, for example from the multiple interfaces, as defined by the engineer, and also on a much smaller level from specific contributions at the atomic and molecular level. To the chemist it is the investigation of the structure at the molecular and even atomic levels that will lead to solutions of the problem of failure of bulk materials that originally seemed useful to the design engineer. The basic concern then becomes determining the atomic and molecular causes of the failure, especially if the chemist must correct the mechanism.

From the chemist's perspective, polymer performance relies on a combination of bond-related and non-bond-related energy contributions. These contributions from the individual bulk materials may not be readily apparent or available by looking at each bulk material. For instance, microstructural domains, which are often studied to understand the link between morphology and engineering performance, represent a macro-scale manifestation of the energy balance originating from the molecular structure. That is, such features originate from the way in which the specific molecular structure responds to the chain structure and its relative orientation with neighboring surfaces. Orientation is also a key parameter that decides a polymer interaction, especially when looking at substrate effects in which interfacial orientation creates properties different than the bulk. So for the polymer chemist looking for the failure mechanism, several questions are always considered: a) whether the interchain interactions are low enough so that only bond forces are important to the mechanical property; b) whether the through space interactions which impact orientational effects are more important; or c) whether the balance of bond and through-space responses are the most critical consideration to understand.

Consider the mechanism of a cycling experiment. Failure can be established by following the same mechanism as in a pure tensile or shear test. Failure can also be established and studied on the molecular level, since relative chain orientations will be constantly changing during each cycle. This change of relative chain orientations suggests that the energy drivers, which set up the orientations and the domains within that bond line, help to determine the bond strength, frequency responses and the ultimate failure. In addition, the adhesive failure depends upon the population of interfacial interactions at the surface. Failure, especially for cycling, then becomes understanding the shifting nature of the interactions that is governed by how the polymer responds to the specific stress. Network structures are even more complicated, supposedly infinite in dimension. However, given the example above, and the geometric and diffusional limits imposed on creating that infinite universe, a simple assumption can be drawn that very few highly chemically crosslinked networks actually are formed that reach from top to bottom through the bond line. It is then how the various networks interact that will form the basis of the performance of the material, whether defined as interpenetrating or entangled. The relative populations of orientations and their interactions will then help determine the survivability of the interface.

For the formulation chemist and the computational chemist then, it is the smaller universe that is addressed for performance issues. The limited assumption taken in the current studies is to understand the potential interactions of the polymer backbone. The basic drivers for structural performance to the organic chemist has always been, higher polarity, higher hydrogen bond characteristic and higher rigidity leads to higher strength. In reality, a tradeoff exists between strength, toughness, and modulus. To the computational chemist it is also clear that these tradeoffs consist of a structural balance between the bond rotational and vibrational movements, and the through space interactions or attractions that constrain local translation. Simple addition of a polar group does not always lead to a more reliable, or "stronger" interface. For the chemist, a simple correlation to structure is sought, leading to the current investigation of reliability issues on a molecular scale.

Therefore, there is still a need to reliably and repeatedly determine the likelihood and degree of failure of particular known and novel combinations of bulk materials, including polymers and substrates that can form an interface without excessive or undue "real-time" experimentation by the researcher. There is also a need to model and preferably predict the success and failure rates of particular combinations of novel or known classes of bulk materials that can be used to form an interface, in order to minimize futile research efforts and to minimize the costs of real-time experimentation.

SUMMARY OF THE INVENTION

The present invention is directed to a method of designing an electronic component and comprises: a) modeling a first material with respect to a characteristic of the first material in a sufficient detail to at least partially account for a first value for the characteristic; b) modeling a second material with respect to a characteristic of the second material in a sufficient detail to at least partially account for a second value for the characteristic; c) modeling an interface between the first material and the second material such that in at least some instances the characteristic of the interface does not have an expected characteristic or an expected value between the first value and the second value; and d) generating a set of evaluation data from the modeling of the interface which characterizes the performance of the interface under certain conditions, such as stress.

In another aspect of the present invention a modeling system is disclosed comprising: a) a computer; b) an output device operatively coupled to the computer that outputs a set of evaluation data; c) a plurality of sets of controls coupled to the computer; and d) a software code that models a first material with respect to a characteristic of the first material in a sufficient detail to at least partially account for a first value for the characteristic; models a second material with respect to a characteristic of the second material in a sufficient detail to at least partially account for a second value for the characteristic; models an interface between the first material and the second material such that in at least some instances the characteristic of the interface does not have an expected characteristic or expected value between the first value and the second value; and generates the set of evaluation data from the modeling of the interface, wherein the code is run by the computer and is coupled to the controls and to the video display.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
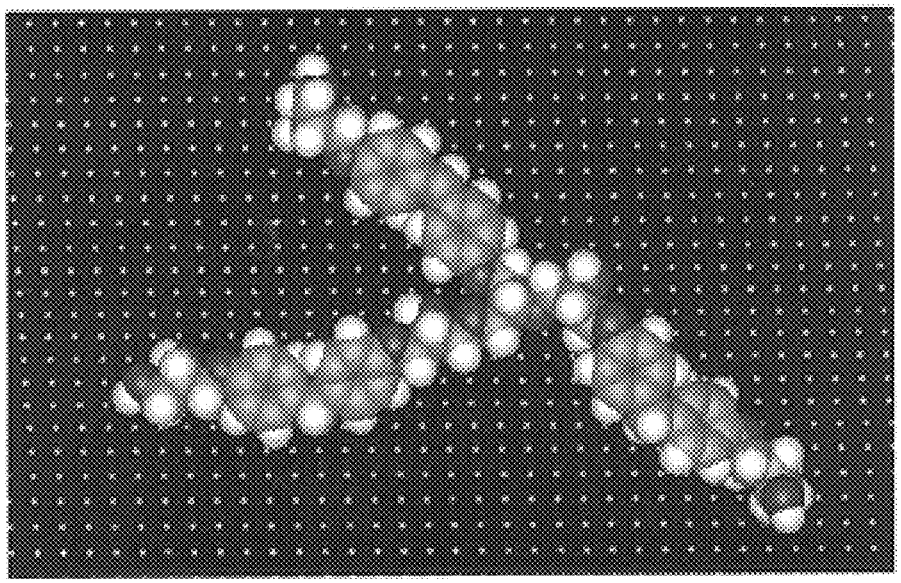
FIG. 1A is a schematic of a trimer of bisphenolA glycidyl epoxy after minimization and before forcing dynamics.
FIG. 1B is a schematic of a trimer of bisphenolA glycidyl epoxy after forcing dynamics.
Figure 1:
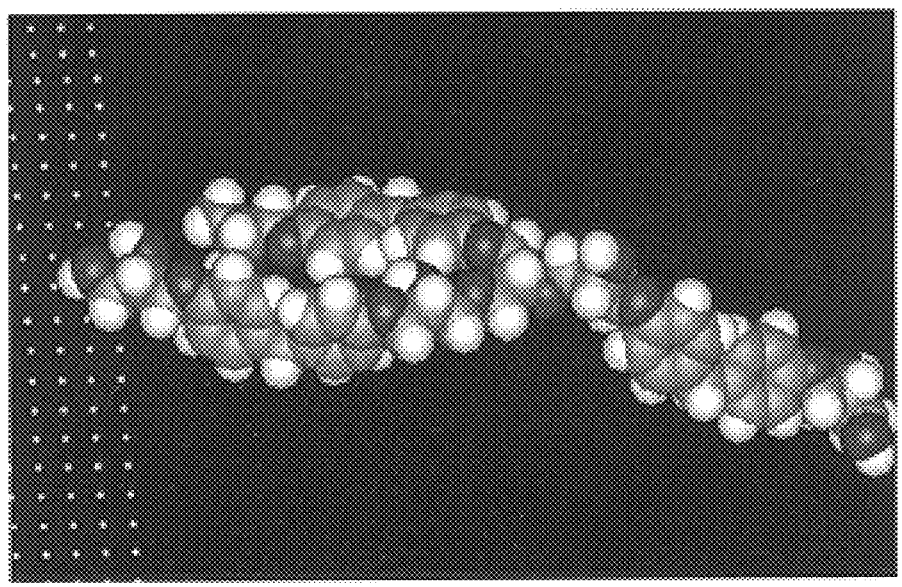

Electronic components have gained widespread use in handheld devices, such as palm-sized organizers, calculators, pagers and cell phones; household electronics, such as microwaves, televisions, video cassette recorders, digital video devices, and stereo equipment; office products, such as computers, printers, copy machines and fax machines; and various methods of transportation, such as airplanes, automobiles, trains and boats.

Engineers and designers of various electronic components and devices use bulk materials, such as polymers, monomers, metals, metal alloys, composites and substrates to produce these components and devices. Engineers and designers use lists of properties of individual bulk materials to begin the design and optimization process of electronic components and devices. However, the specific properties, such as the interfacial properties, can change from the bulk properties, sometimes dramatically, when placed in direct or indirect contact with one another. Therefore, engineers and designers must have reliable information about various combinations of bulk materials if they are going to design and produce efficient and effective electronic components and devices.

Modeling programs and techniques that have traditionally been utilized by chemists and chemical engineers to investigate atomic and molecular interactions within the bio- and pharmaceurtical sciences can be useful to designers and engineers working with bulk materials to produce electronic components.

A contemplated method of designing an electronic component according to the present subject matter, which can be useful to component designers and engineers, comprises: a) modeling a first material with respect to a characteristic of the first material in a sufficient detail to at least partially account for a first value for the characteristic; b) modeling a second material with respect to a characteristic of the second material in a sufficient detail to at least partially account for a second value for the characteristic; c) modeling an interface between the first material and the second material such that in at least some instances the characteristic of the interface does not have an expected characteristic or expected value between the first value and the second value; and d) generating a set of evaluation data from the modeling of the interface.

A first material can be modeled with respect to a particular characteristic of the first material in sufficient detail to at least partially account for a first value for the characteristic. The characteristics are generally used to determine material properties and structural configurations used for a standard finite element analysis. Characteristics that may be desirable to be modeled could be adhesiveness, temperature durability, the ability of a bulk material to withstand particular solvents or chemicals, relative adhesive ability, repetitive strain cycle (which characterizes relative lifetime performance ability of the component or interface), cohesive ability, relative adhesive modulus, and/or relative cohesive modulus. For example, if the desirable characteristic to be modeled is adhesiveness, the first material can be modeled by investigating and mathematically determining the properties of the material that at least partially account for the adhesiveness of the material, such as the strength of the bond as characterized by the total system energy rise when the interface is disrupted, arising from both thru bond molecular forces and non-bond forces such as Van der Waals, coulombic, electrostatic, ionic hydrogen bonding.

As used herein, the terms "adhesiveness" and/or "adhesive characteristics" can be used interchangeably and mean those properties or characteristics that describe, define or otherwise outline the adhesive ability of a first material, a second material or an interface between the first and second materials, including bond strength, degree of bonding, moisture content, ability of an interface to withstand a change in temperature, coulombic interactions, electrostatic interactions, Van der Waals interactions, molecular orientations, interaction volume, interaction distance, interaction dynamics, interaction energies, morphology correlations, surface structure, and network structure. As used herein, the term "strain variables" includes those variables measured from the interaction of a force with the polymer, the interface, or the substrate, and may include some of the properties or characteristics that are also investigated as "adhesive characteristics". Strain variables may also include bond types, crystal structure, amorphous structure, chain structure, degree of disruption of the interface, degree of cracking, degree of fraying, degree of separation of the polymer from the substrate or the other polymer, and degree of force applied.

A second material is also modeled with respect to a characteristic of the second material in sufficient detail to at least partially account for a second value for the characteristic. This process is similar to the same process undertaken for the first material, and the particular characteristic modeled for the first material is also modeled for the second material.

The first value and second value can be presented in any suitable chemical, physical, or engineering standard units, preferably in chemical or engineering standard units. If the values are presented in engineering standard units, it is preferred that they be presented in Pascals, which is a subset of engineering standard units.

The first and second materials may comprise any suitable bulk materials, such as polymer, monomers, composites, metals, metal alloys or substrates. As used herein, the term "monomer" refers to any chemical compound that is capable of forming a covalent bond with itself or a chemically different compound in a repetitive manner. The repetitive bond formation between monomers may lead to a linear, branched, super-branched, or three-dimensional product. Furthermore, monomers may themselves comprise repetitive building blocks, and when polymerized the polymers formed from such monomers are then termed "block polymers" or "block co-polymers" depending on the desired consistency of the blocks. Monomers may belong to various chemical classes of molecules including organic, organometallic or inorganic molecules. Examples of contemplated organic monomers are acrylamide, vinylchloride, fluorene bisphenol or 3,3'-dihydroxytolane. Examples of contemplated organometallic monomers are octamethylcyclotetrasiloxane, methylphenylcyclotetrasiloxane, hexanethyldisilazane, and triethyoxysilane. Examples of contemplated inorganic monomers include tetraethoxysilane or aluminum isopropoxide. The molecular weight of monomers may vary greatly between about 40 Dalton and 20000 Dalton. However, especially when monomers comprise repetitive building blocks, monomers may have even higher molecular weights. Monomers may also include additional groups, such as groups used for crosslinking.

As used herein, the term "crosslinking" refers to a process in which at least two molecules, or two portions of a long molecule, are joined together by a chemical interaction that leads to a branching formation. Such interactions may occur in many different ways including formation of a covalent bond, formation of hydrogen bonds, hydrophobic, hydrophilic, ionic or electrostatic interaction. Furthermore, molecular interaction may also be characterized by an at least temporary physical connection between a molecule and itself or between two or more molecules.

In one aspect of the present invention, a suitable metal that may be used as a first or second material includes titanium, cobalt, copper, nickel, zinc, vanadium, chromium, platinum, gold, silver, tungsten, molybdenum, cerium, promethium, and thorium. Preferred metals include titanium, copper, nickel, platinum, gold, silver and tungsten. More preferred metals include titanium, copper and nickel. The term "metal" also includes alloys, metal/metal composites, metal ceramic composites, metal polymer composites, as well as other metal composites.

Desirable substrates may comprise any substantially solid material or combination of solid materials. Particularly desirable substrate layers would comprise films, glass, plastic, metal, coated metal, ceramics, polymers, monomers or composite material. In the preferred embodiments, the substrate comprises a silicon wafer or germanium arsenide with the silicon wafer being the most preferred.

Once the first material and second material are modeled with respect to a particular characteristic, the researcher models an interface between the first material and the second material, such that in at least some instances, the characteristic of the interface does not have an expected characteristic or expected value between the first value of the characteristic of the first material and the second value of the characteristic of the second material. For example, an engineer investigates two individual bulk materials and contemplates using both bulk materials together to form an interface. The engineer might look at the cohesiveness of each bulk material and estimate that the cohesiveness value of the two bulk materials when coupled may be between the cohesiveness values of each bulk material, since the interface of the two would incorporate contributions from each bulk material. However, molecular and atomic interactions may lead to contributions outside of those predicted from the individual bulk materials or outside of an expected value predicted from each material and an adhesiveness of the interface that is outside of and/or significantly different from the range comprising the adhesiveness of the first material and the adhesiveness of the second material.

As used herein, the term "interface" means a couple or bond that forms the common boundary between two materials. An interface may comprise a physical attachment of two bulk materials or components of the bulk materials or a physical attraction between two bulk materials or components of the bulk materials, including bond forces such as covalent and ionic bonding, and non-bond forces such as Van der Waals, electrostatic, coulombic, hydrogen bonding and/or magnetic attraction. Preferred interfaces include those interfaces that are formed with non-bond forces. As used herein, the term "candidate" means that which is most preferred or most suitable for the particular situation contemplated by the researcher, for the particular requirement of the electronic device, or both.

Once the researcher has selected at least one combination of at least two bulk materials, such as those that would form a candidate polymer/substrate interface, a model of the interface can be generated and studied to evaluate such properties as size, shape, or bond geometries. A computer-assisted method for generating a dynamic model of an interface between a polymer and a substrate comprises: a) visually modeling an atomic representation of the polymer adhered to the substrate at the interface by force equation(s); b) computation of the energy trajectories during a modeling run; c) including molecular strain-related information into the model; and d) using the model to generate data for said polymer/substrate interface, said data including: 1) a number of strain cycles that separates the polymer from the substrate; 2) a magnitude of strain that separates the polymer from the substrate; and 3) a magnitude of the force between the polymer and the substrate.

As used herein, the term "model" means a representation or imitation of an existing object, such as but not limited to a polymer, a polymer/polymer interface, a substrate, a polymer/substrate interface, an electrical device, a component of the electrical device, or any portion or segment of said representation. As used herein, the term "computer-assisted method" means that method that incorporates in whole or in part the use of a computer during the method.

As used herein, the phrase "molecular strain-related information" means that information that influences the size, shape, energy level, form of matter, or temperature of the bulk materials and/or the combination of the bulk materials, such as the polymer, the substrate the polymer/polymer interface, and or the polymer/substrate interface. As used herein, the term "strain cycle" means that period of time whereby a force is applied to the subjects of the model, including the polymer, the substrate, the polymer/polymer interface, and/or the polymer/substrate interface, and then the force is removed and the subjects of the model are allowed to relax back to a representative configuration with no force applied.

Once a model has been generated the interaction of the individual bulk materials, including the polymer, the substrate, the polymer/polymer interface and/or the polymer/substrate interface, the model can be studied theoretically to determine physical characteristics related to the interface or to the formation of the interface, such as relative durability (specifically strain direction (tensile or shear), cure strain, flow strain, and heat equilibration) under specific temperatures or strain variables. Durability is an important quality in the determination of a suitable polymer/polymer or polymer/substrate interface. Durability can include such qualities as a) the amount of force that the interface can withstand before being disrupted, b) the highest and lowest temperature that an interface can withstand before being disrupted, c) the degree of moisture that an interface can withstand before being disrupted, d) the amount of pressure that the interface can withstand before being disrupted.

Finally, a set of evaluation data can be generated from the various models of the individual bulk materials and/or the interface between the two bulk materials. This set of evaluation data can be presented in any suitable chemical, physical, or engineering standard units. It is preferred that the set of evaluation data be presented in physical or engineering standard units. It is more preferred that the set of evaluation data be presented in engineering standard units. And it is even more preferred that the set of evaluation data be presented in Pascals, which is a subset of engineering standard units.

In another aspect of the present invention a modeling system is disclosed comprising: a) a computer; b) an output device operatively coupled to the computer that outputs a set of evaluation data; c) a plurality of sets of controls coupled to the computer; and d) a software code that models a first material with respect to a characteristic of the first material in a sufficient detail to at least partially account for a first value for the characteristic; models a second material with respect to a characteristic of the second material in a sufficient detail to at least partially account for a second value for the characteristic; models an interface between the first material and the second material such that in at least some instances the characteristic of the interface does not have a value of between the first value and the second value; and generates the set of evaluation data from the modeling of the interface, wherein the code is run by the computer and is coupled to the controls and to the video display.

As used herein, the term "software" means the programs, data, and routines for use with a computer, as distinguished from the physical components of the computer. Contemplated software that can be used is basic molecular modeling software. Preferred software is Insight/Discover from Molecular Simulations, Inc, 9685, Scranton Road, San Diego, Calif. 92121. As used herein, the term "computer" means an electronic device, which, by means of stored or provided instructions and information, performs rapid and/or complex calculations, compiles data, correlates data, and selects data. As used herein, the term "output device" means that device that facilitates the presentation of data to the user. As contemplated herein, an output device may include a monitor, a speaker, a printer, or a television screen. As used herein the phrase "a plurality of sets of controls coupled to the computer" includes those means which couple two or more devices, such as coaxial cable, parallel or serial cable, or infrared device, a keyboard, a computer mouse, a microphone, or a touch-pad device.

EXAMPLES

Example 1

Molecular systems used in this study are usually represented by oligomers or to systems no larger than around 100–200 heavy atoms per single chain and a maximum substrate surface of up to 2,000–3000 atoms, depending upon the packing density and surface area. The substrate atoms are held fixed for ease of computation. All hydrogen atoms are included in the model calculations. These system preferences allow the maximum model size to be small enough so that an exploratory search of many different structures can be done without spending large amounts of time.

The initial assumption is simple: we assume that the highest contribution to reliability comes from the highest chain interaction configuration possible, and that this interaction will evolve from both the chain and the network structure. To approximate this assumption, we start with a mutually oriented structure, minimize to determine a better structural fit, and either force the chains apart for cohesion insight, or off a substrate surface for adhesion insight. For this work, we do not worry about the network structure, as we are concerned about determining the best combination of group, monomer, or chain structure that will enhance chain interaction. A second assumption is also used: the lowest energy configuration of the system in study is that of the minimized form. This assumption then suggests that as the chain undergoes stress, higher energy states are being attained so that in the course of failure generation, you will always progress away from its minimum energy state. This assumption is reasonable as the energy used to strain anything must go toward both translation and deformation.

The strain cycling model is done using a set mechanical strain target during a forcing step in which the polymer is pulled away from it's substrate (either another polymer chain or an inorganic surface). The set strain is determined by either the distance the molecule moves normalized by the molecule's length parallel to the direction of strain, or by the distance a forcing unit (such as an atom on the molecule or the geometric center of a group of atoms on the molecule) moves normalized by the length of the molecule parallel to the direction of strain. A relaxation step is also done, in which the polymer is allowed to equilibrate with its substrate before proceeding with the next strain step. Failure on this scale is defined by complete separation of the structures under investigation. The procedure is repeated using different strain targets. FIG. 1A and FIG. 1B shows a schematic of how a model may look before and after cycling, near failure.

Figure 2:
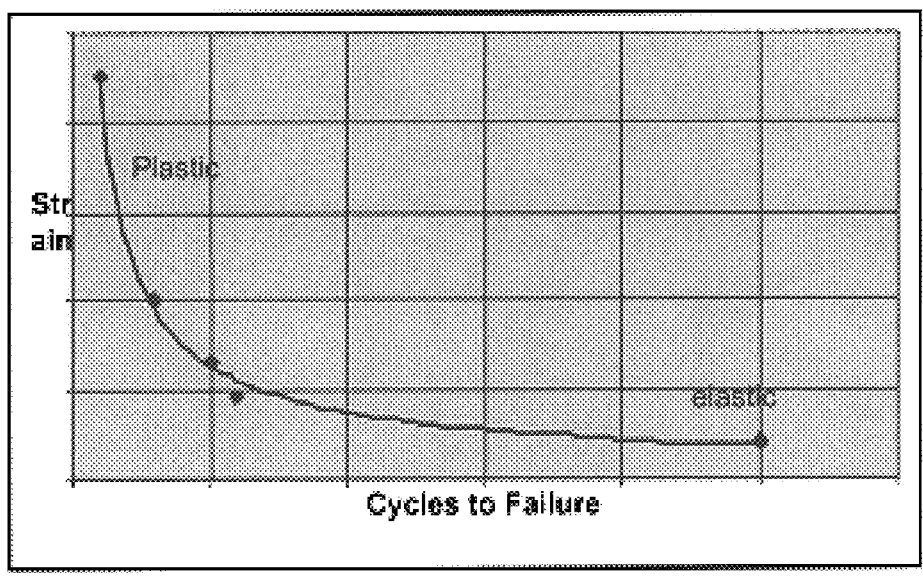
FIG. 2A is an example of a typical molecular cycling result showing Coffin-Manson response, by showing the overall response to the number of cycles.
FIG. 2B is an example of a typical molecular cycling result showing Coffin-Manson response, by showing the log transformation of the response to the number of cycles.
Figure 2:
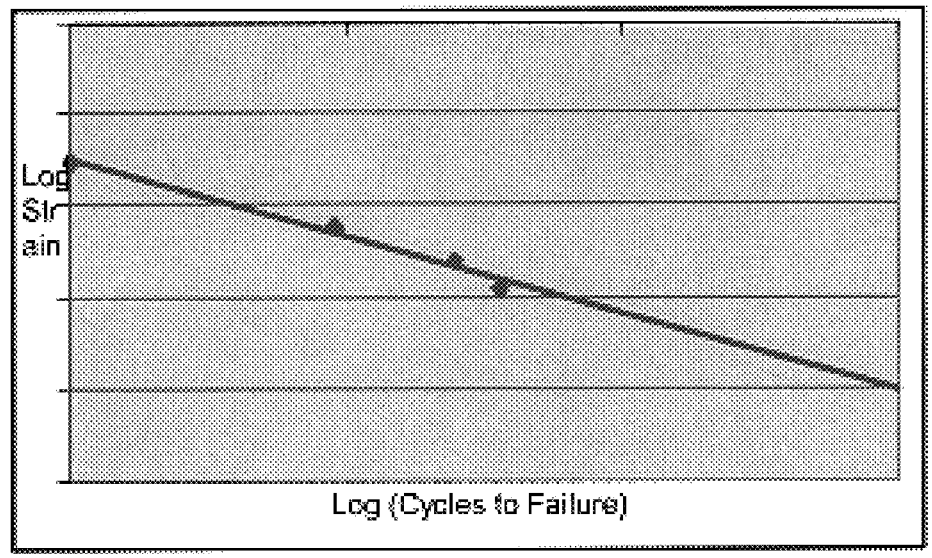

Work to date has indicated a Coffin-Manson type of response to cycling, which is shown in FIG. 2A and FIG. 2B for a typical result of the modeling. The Coffin-Manson Theory predicts a power relationship between the strain and the number of cycles. A log—log plot of strain vs. number of cycles produces a straight line from which many cycles can be extrapolated. The extrapolation is used to determine a qualitative tendency of the polymer in question to survive cycling. For the molecular cycling, this analysis is always used in a comparative way, so that relative rather than exact strain predictions are obtained. By using a similar high cycle extrapolation (for instance 500 or 1000 cycles) benchmark, formulations can be compared as to their relative tendency to survive high cycling as measured by whether a higher strain is sustained compared to the competitor. For structural analysis, all of the different interfaces in contact with a polymer may be calculated. The relative differences in the amount of strain that the different interfaces can sustain, help to pinpoint failure causes.

Results of the modeling analysis are found in FIGS. 3–9. All modeling investigated the difference between the theoretical "cohesive" (polymer/polymer interface) and the "adhesive" (polymer/substrate interface) interactions.

Figure 3:
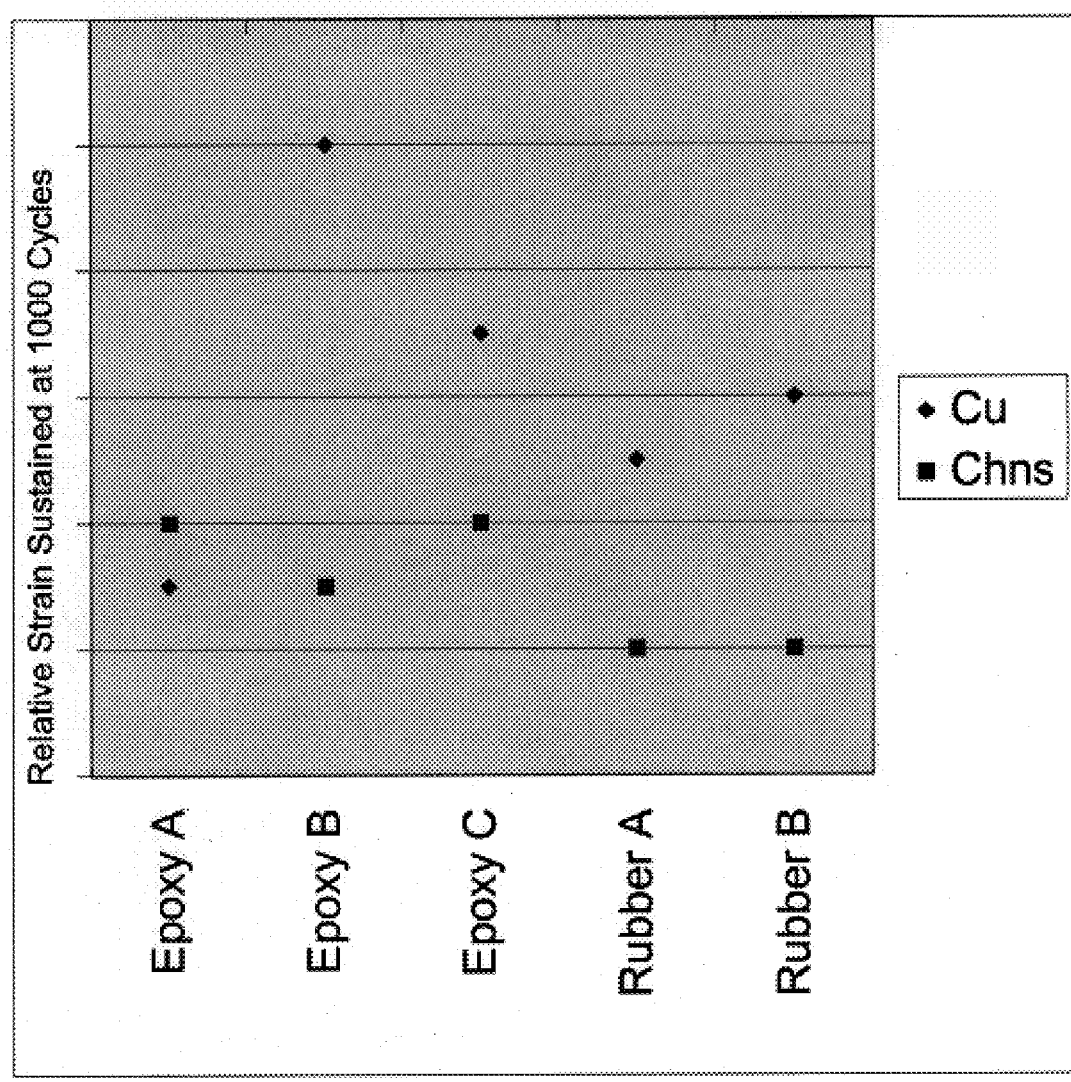
FIG. 3 is a graph of the cycling results of five different resin types contrasting performance differences for both adhesive and cohesive cases. Epoxy A is a trimer of bisphenol F glycidyl ether; Epoxy B is a trimer of cycloaliphatic epoxy; Epoxy C is a trimer of bisphenol A glycidyl ether; Rubber A is a silicone that is a copolymer of PDMS and norbornylmethylsilane; and Rubber B is polybutadiene.
Figure 4:
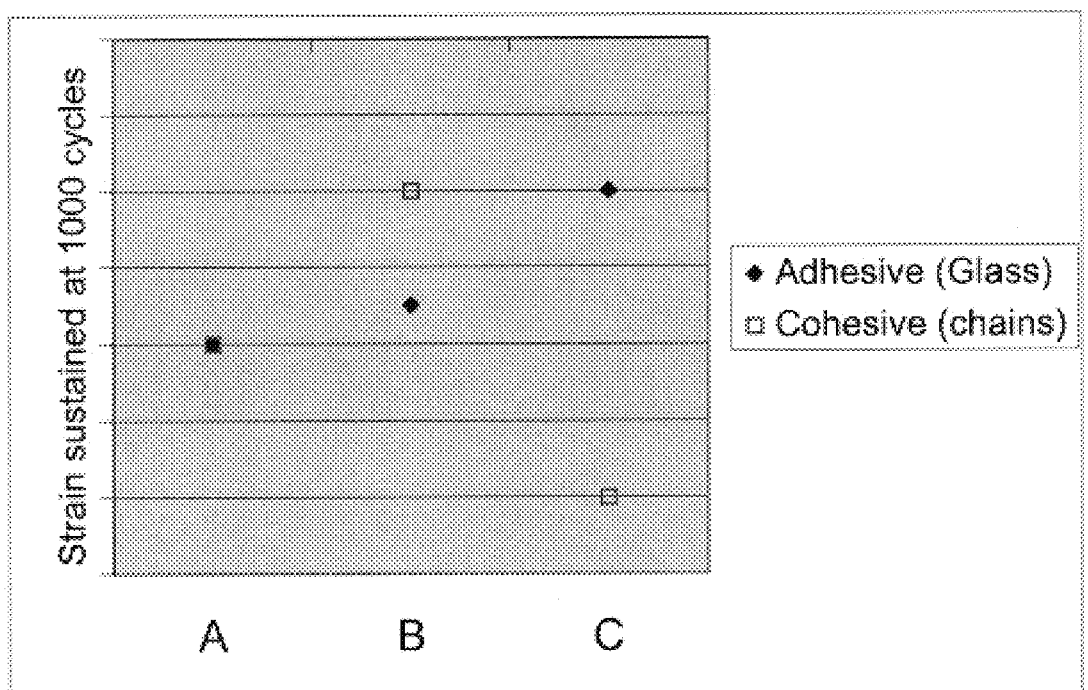
FIG. 4 is a graph of the cycling results using glass as a substrate. A is a trimer of bisphenol F glycidyl ether; B is a trimer of cycloaliphatic epoxy; C is a copolymer of PDMS and norbornylmethylsilane.

The first model studies concentrated on comparing resin types to predicted cycling tendency. FIGS. 3 and 4 show the results of this study comparing three different epoxy types and two different rubber formulations for adhesive cycling on copper and for cohesive cycling. For ease of comparison, the strain at the extrapolated 1000 cycle benchmark was used. Experimental test results on formulations made with these materials have shown that the second epoxy material ("Epoxy-B") survives thermal shock treatments the best, with the adhesive strain being highest. We have previously reported results on adhesion modeling and confirmatory experiment that indicated "Epoxy-B" had the best moisture resistance. In general, the cohesive interface is the usually the weakest interface found.

To investigate additional surfaces using the modeling technique, glass surfaces were also studied using three different formulations. The modeling results are shown in FIG. 4 indicating that formulation B has the best overall predicted cohesive and adhesive cycling performance. Although preliminary, experimental tests have indicated that the middle formulation B has better interfacial qualities and has been selected for further study in applications.

Figure 5:
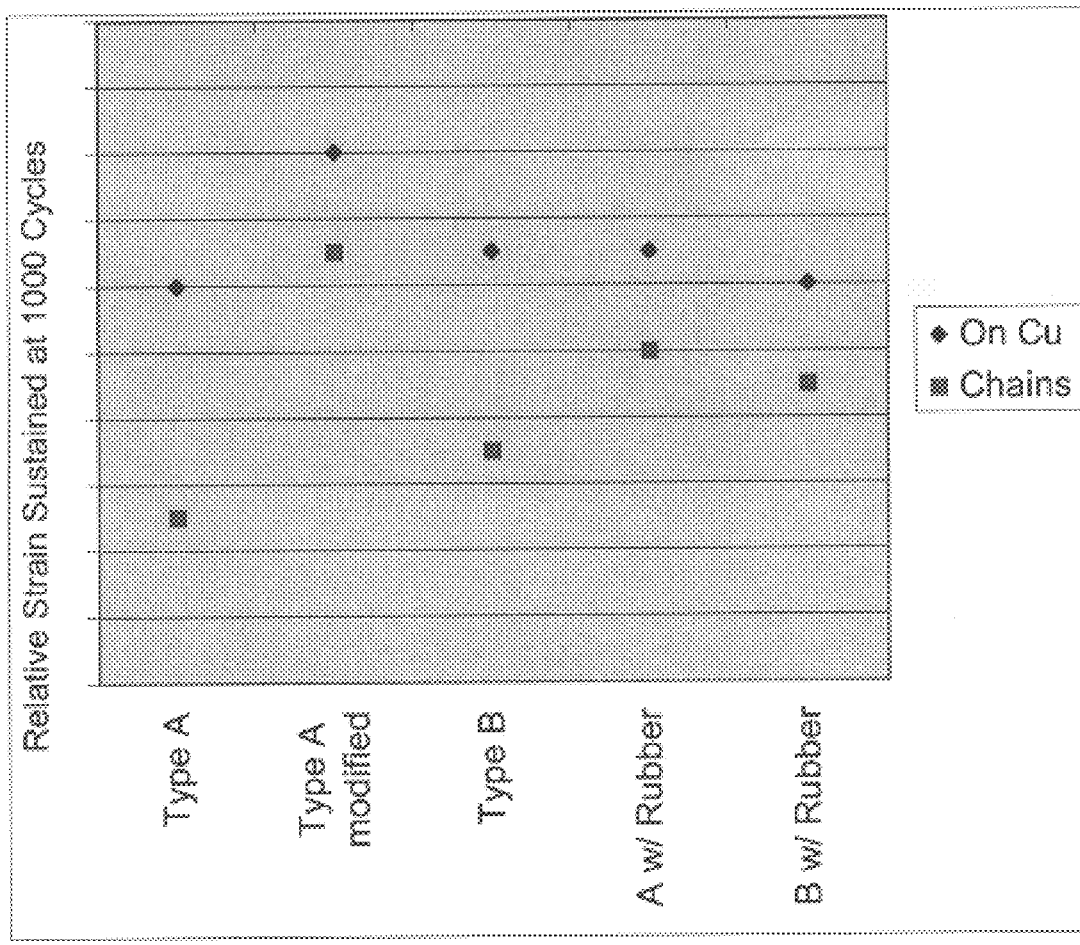
FIG. 5 is a graph of the cycling results of ongoing formulation development showing the effects of modification for the adhesive case on copper substrate and the cohesive case on polymer/polymer interface chains.

FIG. 5 shows the 1000 cycle strain intercept results for ongoing materials development using two basic formulation types. In this case copolymers of resin blends have been studied. According to the model all interfaces should fail cohesively first, having the lowest strain. However, modificaton "A" is better than the original material formulation and should help sustain both the cohesive and adhesive interface. In addition, FIG. 5 shows that rubber toughening is predicted to enhance the cohesive cycling survivability of both formulation types.

Experimentally, we have found that Modification "A" is absolutely necessary to survive cycling tests, whereas rubber toughening does not help to the same extent as the modification. Modification "A" is a common practice used in the circuit board industry in which engineers use a permanganate treatment, or similar organic oxidizer, to chemically "roughen" the surface. On a molecular scale, it can be identified as an oxidation step.

Figure 6:
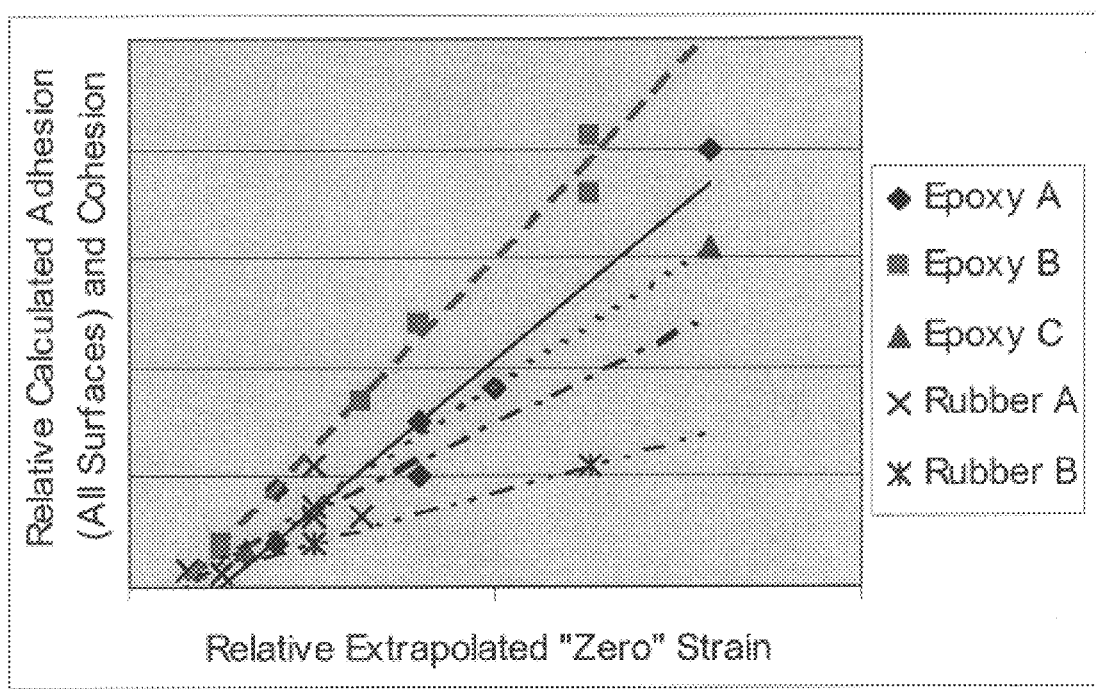
FIG. 6 is a graph of the combined adhesion and cohesion versus the "zero strain" intercept of the cycling results contrasting resin performance. Epoxy A is a trimer of bisphenol F glycidyl ether; Epoxy B is a trimer of cycloaliphatic epoxy; Epoxy C is a trimer of bisphenol A glycidyl ether; Rubber A is a silicone that is a copolymer of PDMS and norbornylmethylsilane; and Rubber B is polybutadiene.
Figure 7:
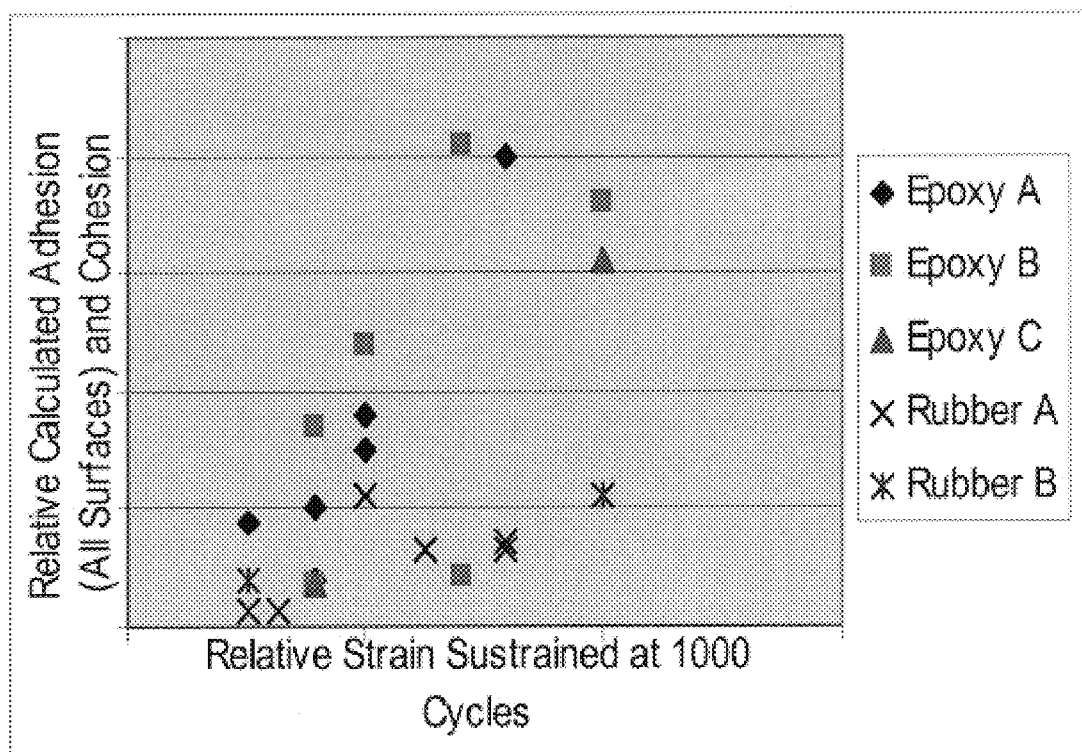
FIG. 7 is a graph of combined adhesion (polymer/substrate interface) and cohesion (polymer/polymer interface) versus "1000 cycle intercept". Epoxy A is a trimer of bisphenol F glycidyl ether; Epoxy B is a trimer of cycloaliphatic epoxy; Epoxy C is a trimer of bisphenol A glycidyl ether; Rubber A is a silicone that is a copolymer of PDMS and norbornylmethylsilane; and Rubber B is polybutadiene.

Additional analysis can give an indication of interfacial sensitivity and the relationship to adhesion (which can be thought of as a one-cycle failure test). FIG. 6 is a plot of the predicted adhesion across all of the interfaces studied and the theoretical "zero strain" intercept of the Coffin-Manson log—log plots. Interestingly, FIG. 6 suggests that a relationship may exist between the adhesion and the theoretical "zero cycle" strain (which can be thought of as the idealized maximum strain the specific interface can handle).

A marked difference between material types is found in which "Epoxy-B" has the greatest sensitivity to changes in interface type. As expected, both of the rubbers evaluated in this modeling have the lowest responses in FIG. 6 indicating that they may sustain high strain with low force.

However, because FIG. 6 is non-specific about the definition of the interface (as all interfaces are represented), FIG. 6 also argues for understanding the balance in properties necessary for failure. For example, to maintain a similar adhesive level to another material, "Epoxy-B" sustains a lower theoretical zero cycle strain and this specific interface may fail first given an adequate amount of stress is present. By contrast, the other material may be sustaining a higher strain, but this may be due to a different interfacial contribution than the one failing for "Epoxy-B". If this is a blend of the two materials this second interfacial contribution may contribute to survivability of the overall adhesive bond. For combination interfaces then, the analysis of the zero strain contributions can help pinpoint potential material or structural weaknesses.

Figure 9:
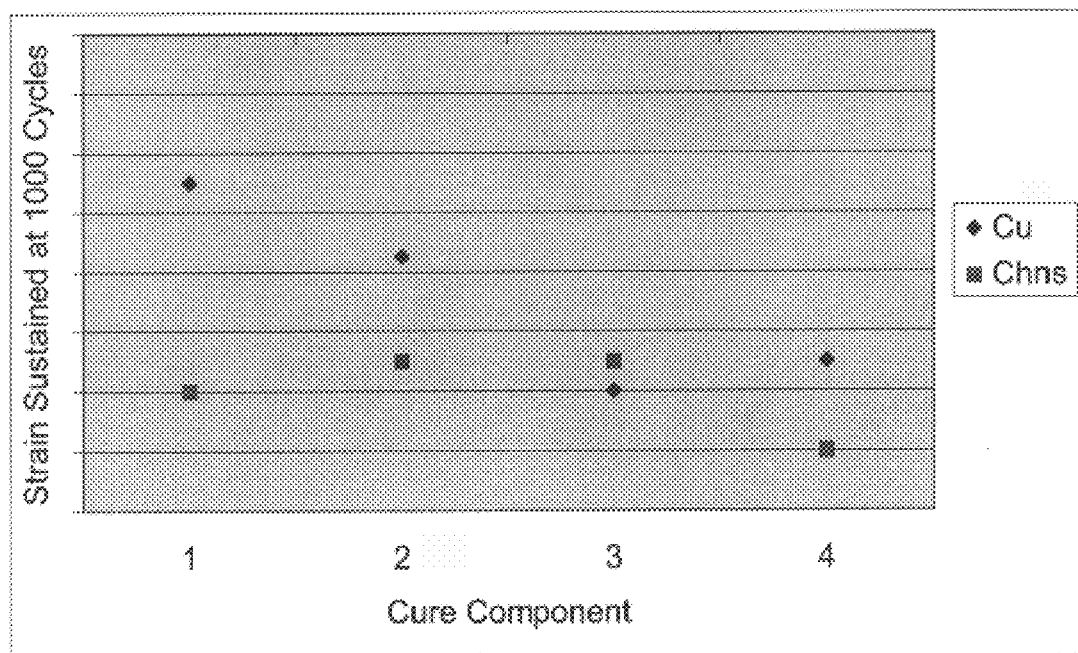
FIG. 9 is a graph of a cure component study of viafill formulation primary resins. Component #1 is a trimer of bis 3,4 epocycyclohexylmethyladipate; Component #2 is the oxaxolidinone formed from the rearranged adduct of 1,1 bis(4-cyanatophenyl) ethane and bisepoxycyclohexylmethyl adipate; Component #3 is a combination oxazolidinone and isocyanurate product derived from the rearranged adduct of 1,1 bis(4-cyanatophenyl) ethane bisepoxycyclohexylmethyl adipate; and Component #4 is the isocyanurate formed from the rearranged adduct of 1,1 bis(4-cyanatophenyl) ethane bisepoxycyclohexylmethyl adipate.

It is worthwhile to iterate that FIG. 6 says nothing about cycling ability. If a similar analysis is done for the 1000 cycle intercept (FIG. 7), no correlation is suggested between the adhesion and the strain sustained at 1000 cycles. This lack of correlation indicates a sensitivity and dependence of the cycling performance on the interfacial structure. For cycling prediction, then, each interface should be individually modeled rather than assuming high adhesion will lead to high reliability. Interestingly, just like the "zero cycle" extrapolation, both rubber models in FIG. 7 appear to have the least sensitivity to the interface (lowest points in general) which suggests they can sustain higher strains at lower energies. So the "zero cycle" strain and the 1000 cycle intercept can be used to help one distinguish between brittle or rubbery materials as shown in FIG. 9 which plots the predicted "zero" cycle strain with the 1000 cycle intercept results.

Figure 8:
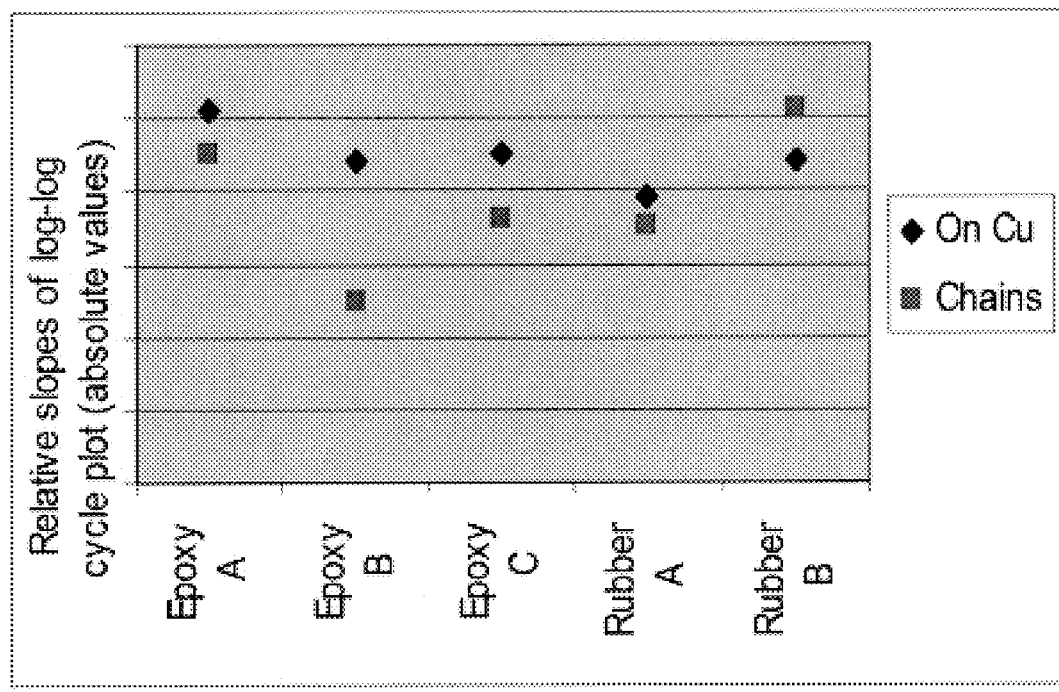
FIG. 8 is a log—log cycle plot contrasting the cycling sensitivity of five resins. Epoxy A is a trimer of bisphenol F glycidyl ether; Epoxy B is a trimer of cycloaliphatic epoxy; Epoxy C is a trimer of bisphenol A glycidyl ether; Rubber A is a silicone that is a copolymer of PDMS and norbornylmethylsilane; and Rubber B is polybutadiene.

An additional analysis of the slopes of the Coffin-Manson log-log cycle plot may also be done. This analysis helps to determine the sensitivity of the interface to the number of cycles. FIG. 8 shows the results of such an analysis for the five resin types previously mentioned. Interestingly, FIG. 8 indicates that the "Epoxy B" chains have the lowest absolute slope, showing the least sensitivity to cohesive cycling, whereas Rubber A shows the lowest adhesive sensitivity to cycling.

However, it is important to iterate that the adhesion tendencies will not be the same as the cycling abilities, as adhesion is usually as a high strain event and the cycling a lower stain event. If a similar analysis is done for the 1000 cycle intercept, no correlation is suggested between the adhesion and the strain sustained at 1000 cycles. This lack of correlation indicates a sensitivity and dependence of the cycling performance on the interfacial structure. For cycling prediction, then, each interface should be individually modeled rather than assuming high adhesion will lead to high reliability.

Taken altogether a performance profile can be drawn for the various systems studied. For example, of the epoxies, "Epoxy B" is expected to be able to sustain the highest cohesive strain with low sensitivity to the number of cycles, but have relatively high sensitivity to the interface definition. By contrast, the rubber materials may have high adhesive cycling ability sustaining higher strain, but their cohesive cycling ability is much lower than the other resins and overall their strength is lower so they will not sustain high stress. These contrasting profiles may be expected given the types of materials, but demonstrates the potential usefulness of the analysis, especially when looking at new formulations and new polymers.

An example of using the modeling results to affect formulation development can be found by referring to FIGS. 3 and 4 above. Modeling indicated that a good mix of survivability for the cohesive, copper adhesive and glass adhesive interfaces might be found with resin B. Experimental tests indicated that B had better interfacial qualities and was been selected for further study in applications. For instance, B was used in a formulation that made use of both B and rearranged cross products of B and a cyanate ester. This formulation was tuned for a viafill application (the JM3200 series) and FIG. 9 shows the stress-cycling results of the four major cure components and their predicted cycling abilities. Using stress cycling analysis as well as adhesion analysis, the catalysis of this formulation was adjusted to try to maximize of best performing cure components (components 1 and 2) and to minimize the worst (components 3 and 4).

According to our panel testing when the catalysis was tuned correctly, this viafill showed superior robustness compared to other leading viafill formulations. This is shown in the cross-sections found in FIG. 6 where our viafill material is intact after 500 cycles Condition B thermal cycling, whereas competitor materials began to show cracking (middle figure) and degradation (left figure) after only 200 cycles.

Example 2

Figure 10:
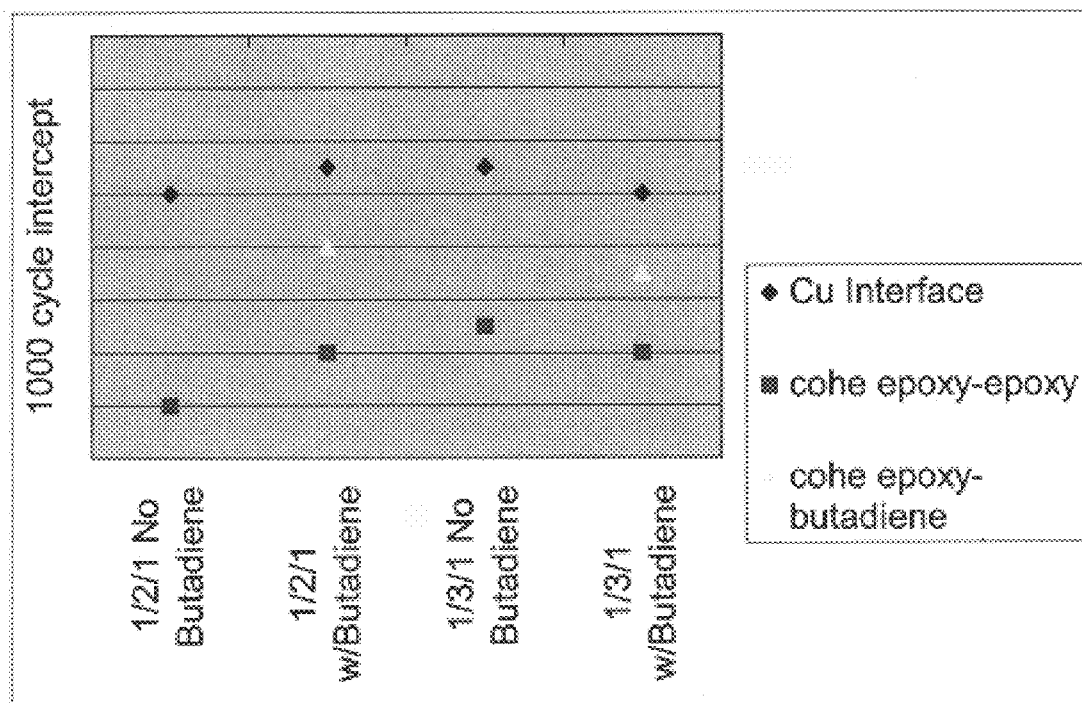
FIG. 10 is a graph of cycling results of a rubber modification.

It is commonly thought that moving failure toward the cohesive bulk and away from the adhesive interface was one way of controlling delamination. For instance, a benchmark formulation study was done on a melamine/novolac/bis A epoxy mixture. FIG. 10 shows that rubber seemed to enhance formulation of melamine/novalac/bisA cycling because of the presence of the epoxy-rubber interface (triangle points). Note that these melamine/novalac/bisA epoxy formulations were being provided by a commercial vendor (Shipley), and consistently were having problems with cohesive failure. It is obvious then that this analysis also allows one to study stoichiometric effect (the 1/2/1 and 1/3/1 represent the ratios of melamine/novolac/bisA epoxy used, as parametric guesses based upon the Shipley MSDS's) as well as the effect of additive resins.

Figure 11:
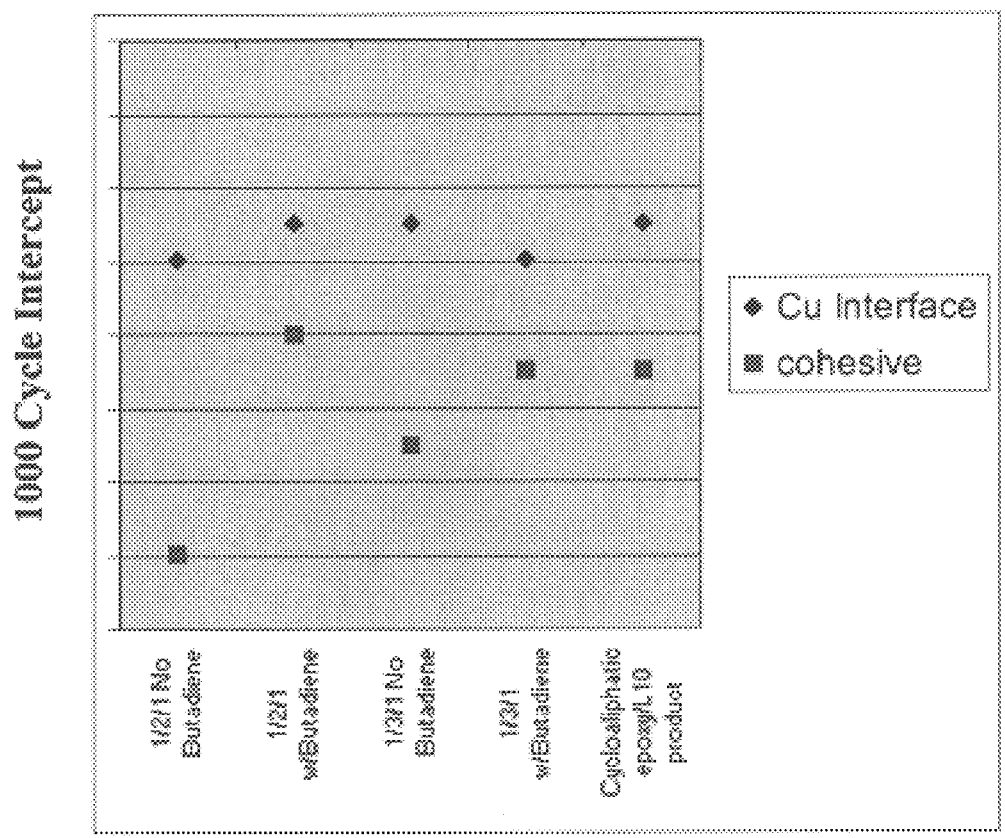
FIG. 11 is a graph showing several viafill formulations versus a 1000 cycle intercept as a function of a Cu interface (polymer/substrate interface) and a cohesive interface (polymer/polymer interface).
Figure 12:
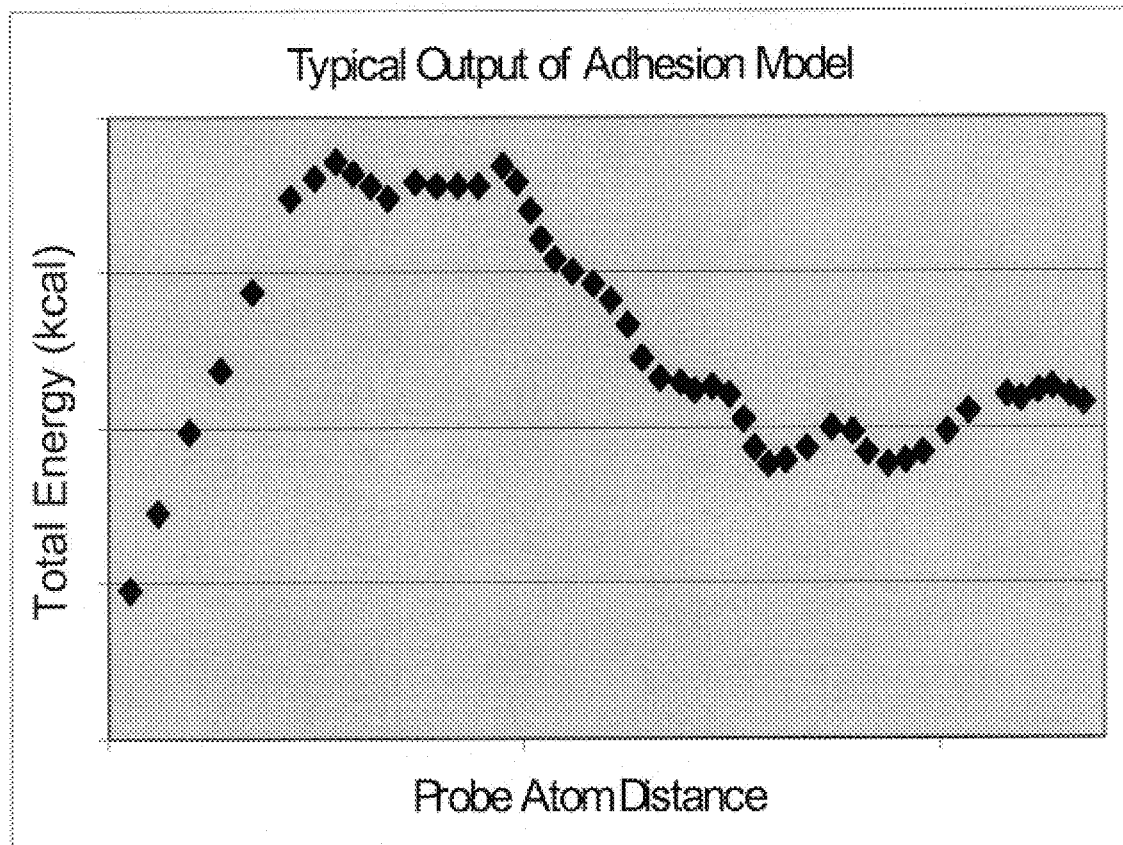
FIG. 12 shows a typical energy trajectory of a forcing dynamics run.

A second piece of experimental data was obtained by our own internal viafill formulations and is shown in FIG. 11. They consisted of L-10/cycloaliphatic epoxy formulations, and appeared to undergo thermal cycling quite well without failure (L10 is also known as 1,1 bis [4-cyanatophenylethane] available from Ciba-Geigy.) The general formulations are shown in U.S. Pat. No. 6,057,402 issued Zhou et al. (May 2000). The cycling ability according to the cycling models was as good as the rubber modified melamine/novolac/bisA formulations (far right example in graph).

Because of these correlations to the already established formulations, additional possible formulations were sought where the cohesive strain cycling was close or better than the rubber enhanced melamine/novolac/bisA formulations as a benchmark. So far the modeling has shown 6 possible systems with adequate cohesive cycling (A–F).

Figure 13:
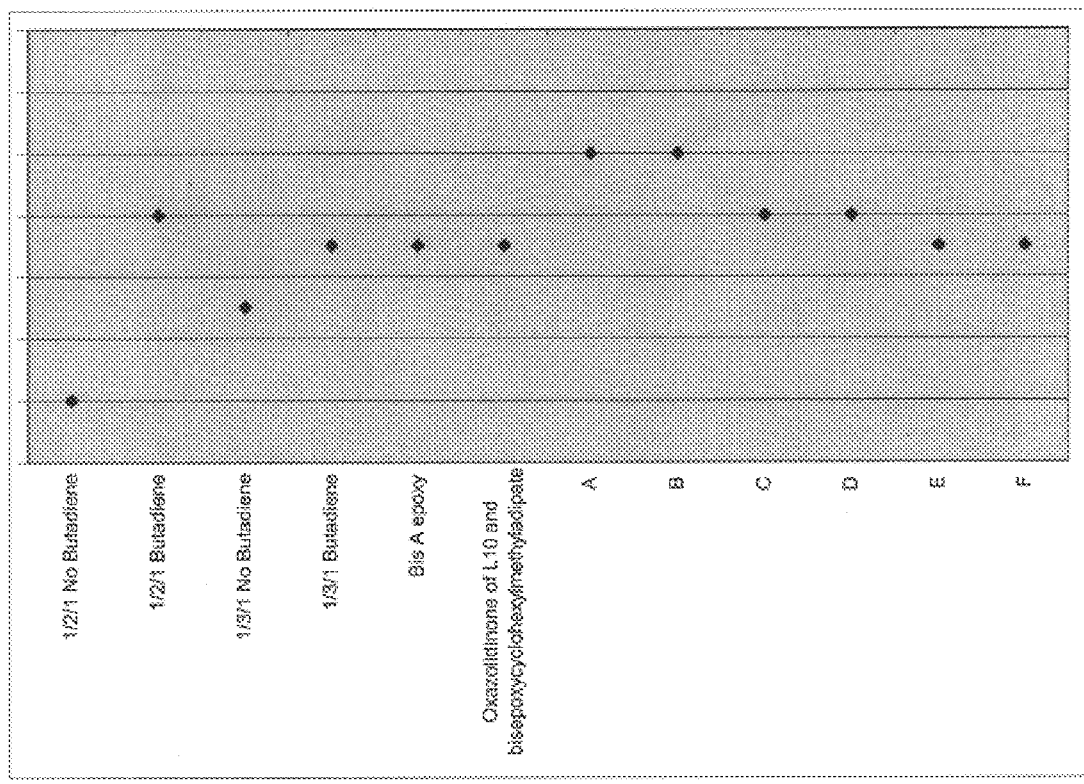
FIG. 13 is a graph showing several novel formulations versus a 1000 cycle intercept as a function of a cohesive interface (polymer/ polymer interface). A is the product between trihydroxyethylisocyanurate and trisepoxypropyl isocyanurate; B is the product between trisepoxypropyl isocyanurate and oxydianiline; C is the product between trisepoxypropyl isocyanurate and bisphenol A epoxy; D is the product between trisepoxypropyl isocyanurate and oxybiscyclopentene oxide; E is the product between trihydroxyethylisocyanurate and trihydroxyethylisocyanurate; and F is the product between oxybiscyclopentene oxide and bisphenol A epoxy.
Figure 14:
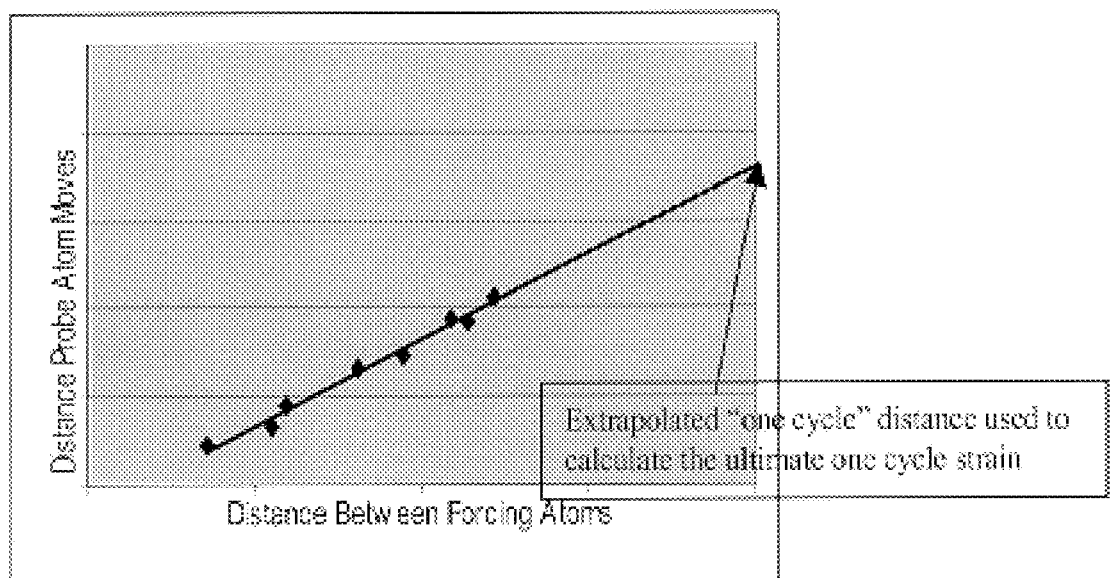
FIG. 14 shows an example of the extrapolation used to determine the distance a probe atom would move at ultimate one-step failure.

The strain direction used in the stress cycling method is very important and is determined through a large strain adhesive model (FIGS. 13 and 14). The polymer is forced off of its substrate in various directions in relationship to the substrate, and the highest energy direction is determined. Usually, this is determined by the activation energy determined in by the model (the highest energy obtained minus the initial energy).

In addition, the following steps are taken:
A. The stress vector is used which goes through the highest amount of the material (usually through the bulk of the polymer).
B. Usually a shear direction is used where there is more interaction with the substrate or other polymer over the length of the polymer(s) and which will lead to longer cycling runs than a stress direction which is orthogonal to the bulk of the polymer. The shear direction is preferred when there are no known orientational restrictions.
C. Crosslink points are very important especially if you are using a resin like an epoxy (which has a high probability of crosslinking). If there is a high possibility of crosslinking, it is important to use this as the base-polymer model, rather than a straight chain. If the polymer is loosely crosslinked, both models should be run to determine the extent of importance to cycling.
D. A preferred forcing atom is used, rather than a molecule or atom clusters. The preferred forcing atom is usually at the end of an oligomer, or close to a crosslink, depending upon the minimized conformation of the polymer how it orients to the substrate and the forcing direction used. That is sometimes it flattens out next to the substrate, and an end atom can be used; sometimes it "balls" up and a crosslink point is chosen. The final choice of the forcing atom (probe atom) is usually made by the initial adhesion models run to determine stress direction.
E. Normalization and determination of relative strain: This is another quirk of the method in order to obtain results that are comparable from system to system. The preferred method at this time is to calculate the strain obtained by the using the distance that the probe atom is moved by the total length of the polymer. The normalized strain is obtained by further normalization by the cross-section of the active atoms (usually the chain). Other normalization schemes have also been used, and it is important to be consistent.

In order to compare different systems in the Coffin-Manson correlation, the strain is normalized by the cross-section (previously mentioned) and also by the one-step ultimate strain (FIG. 14), which is determined by extrapolation. The extrapolation is done using the data obtained in the one step adhesion models (the ones used to determine stress direction and probe atom definition). Since the forcing vector is defined by two atoms (for example for a substrate and polymer, one atom on the substrate and one atom on the polymer), the distance between the forcing atoms and the distance the probe atom on the polymer moves is plotted. The line is extrapolated to ultimate failure defined by when the substrate and polymer separate, then the distance the probe atom moves is used to calculate the ultimate one step strain.

The presence of a molecular mechanism to help explain stress response is significant because it indicates a basic relationship to performance on a molecular level. Such models could help the engineer understand the basic material weaknesses and help him implement correct process procedures.

Example 3

Figure 15:
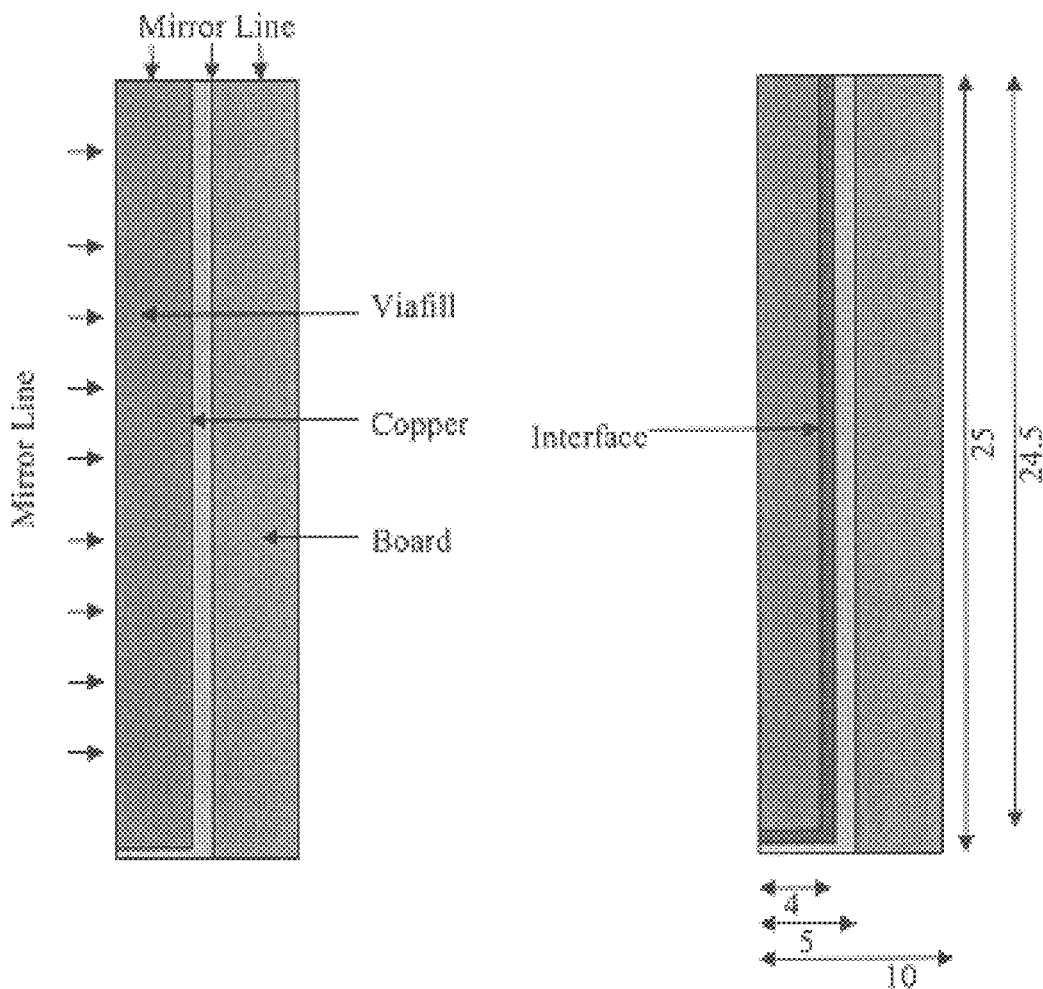
FIG. 15 shows a model layout using ¼ layout. a. General Layout; b. Including an Interfacial Zone in the Viafill

A static FEA (Finite Element Analysis) analysis was done to determine Cu survivability of 8×50 mil vias using the temperature dependent Sanei Kagaku viafill properties reported (FIG. 15). Because the board properties were not specified, generic Mitsubishi BT properties were used. The static FEA analysis looked only at stress buildup to determine the tendency for Cu failure. The temperature range was from 300 to 500° K. Typical failure usually occurred on the Cu side walls (barrel). With no viafill present, the copper stress in the forward analysis direction (material expansion) was not high enough for failure; but for the reverse analysis direction (material shrinkage), vertical wall stress was high enough to indicate Cu failure. Generally stresses increased with increasing board modulus. For the via-filled cases, stresses increased with both increasing board and viafill modulus. As with the no-fill case, the reverse analysis direction indicated failure potential with material that appeared to survive in the forward analysis direction. Adjusting the CTE of both materials did not significantly reduce the maximum stresses achieved, but did show minor improvements. Temperature dependence was also a secondary effect, indicating that understanding the material's response to temperature will be important to tuning materials.

The Sanei Kagaku material properties and the Mitsubishi BT properties from the vendors were reported in Table 1 as follows:

TABLE 1

| | Nominal Material Values | | | | |
|---|---|---|---|---|---|
| | Youngs Modulus | | | CTE | |
| | 30° C. | 125° C. | 250° C. | <121° C. | >121° C. |
| Sanei Kagaku IRT7103 | 6.1 GPa | 4.1 GPa | .2 GPa | 57 ppm | 167 ppm |
| Mitsubishi BT | | 19 GPa | | 26 ppm (highest) | |

These properties were initially introduced into the model. Further analysis was done by varying the properties around these initial values, including introduction of theoretical shear moduli. The properties used are included in the tables in the next section. For temperature dependent properties, the RT elastic and shear moduli are shown respectively in Tables 2–6. When temperature dependent properties are used, they are scaled similarly to the Sanei Kagaku material. For 500° K. temperature properties, either a 60% reduction in modulus from RT (to assume the material has not passed Tg) or a 90% reduction in modulus from RT (to assume the material has passed through Tg) was used. For temperature dependent properties, the viafill materials assumed a 50 ppm initial CTE and a 167 ppm a high temperature CTE unless otherwise stated in the table; all board materials assumed a 25 ppm CTE and a CTE of 167 ppm at 500° K. unless otherwise stated. For temperature independent properties, the 50 ppm was used for the viafill and 25 ppm was used for the board unless otherwise indicated in the table. In all analysis, 300 MPa was assumed as the Cu failure criterion for both tensile and compressive estimates.

Results

Tables 2–6 of the results are given below where the stresses are shown as maximum magnitudes sustained in a strip of material through the copper layer (potential failure), and where X, Y represents the X-stress direction and the Y-stress direction. The X direction usually leads to stresses representing top/bottom via Cu layer failure, and the Y direction usually leads to stresses representing copper wall failure. All stresses in the tables are given in terms of MPa and the nominal properties are highlighted in the following Tables.

Figure 16:
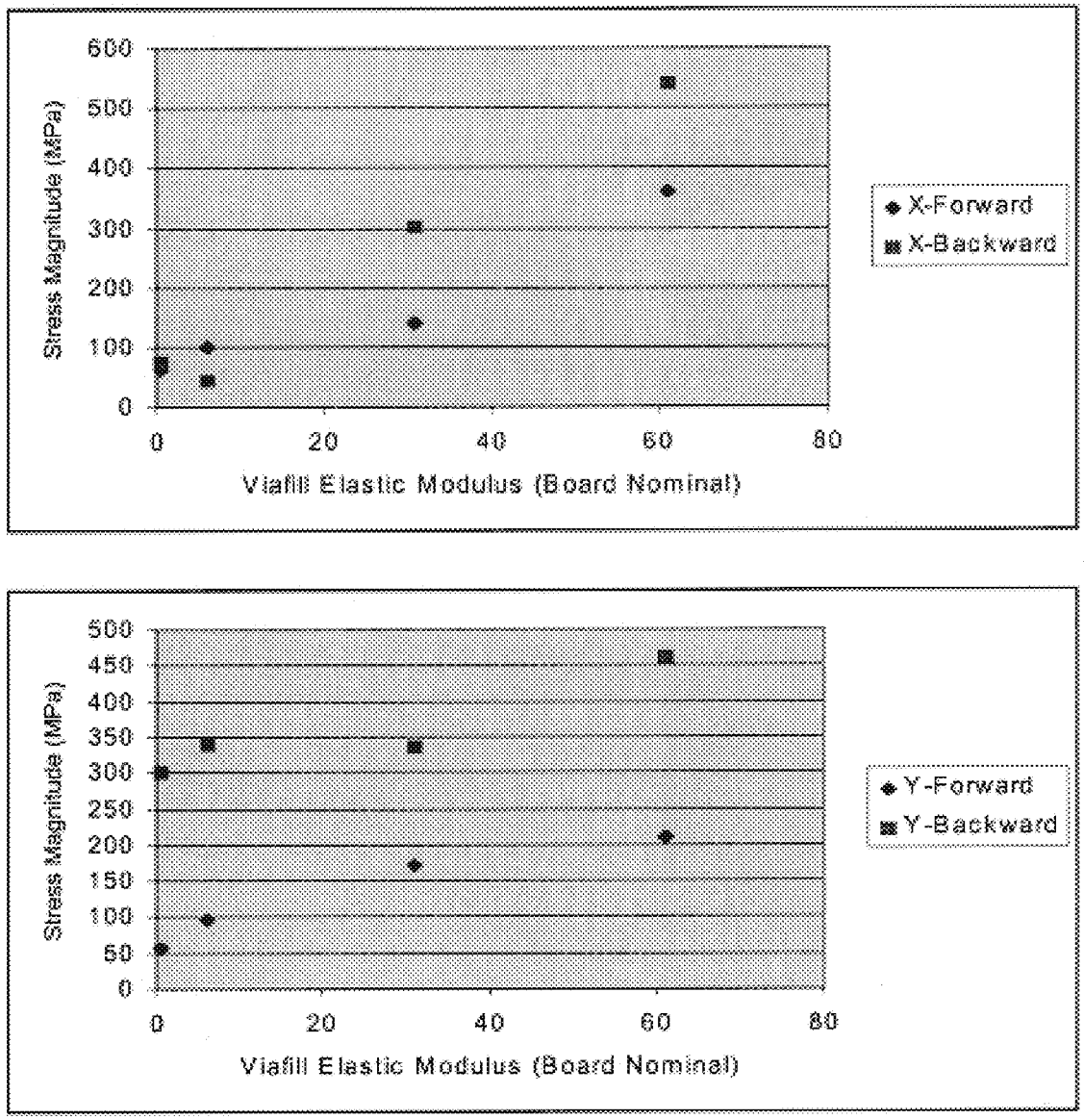
FIG. 16 shows that top/bottom Cu failure (X) is predicted to occur before side-wall (Y) Cu failure with increasing viafill modulus; however for the reverse direction wall (Y) failure is suggested to occur first with both top/bottom and wall failure occurring at high viafill moduli.
Figure 17:
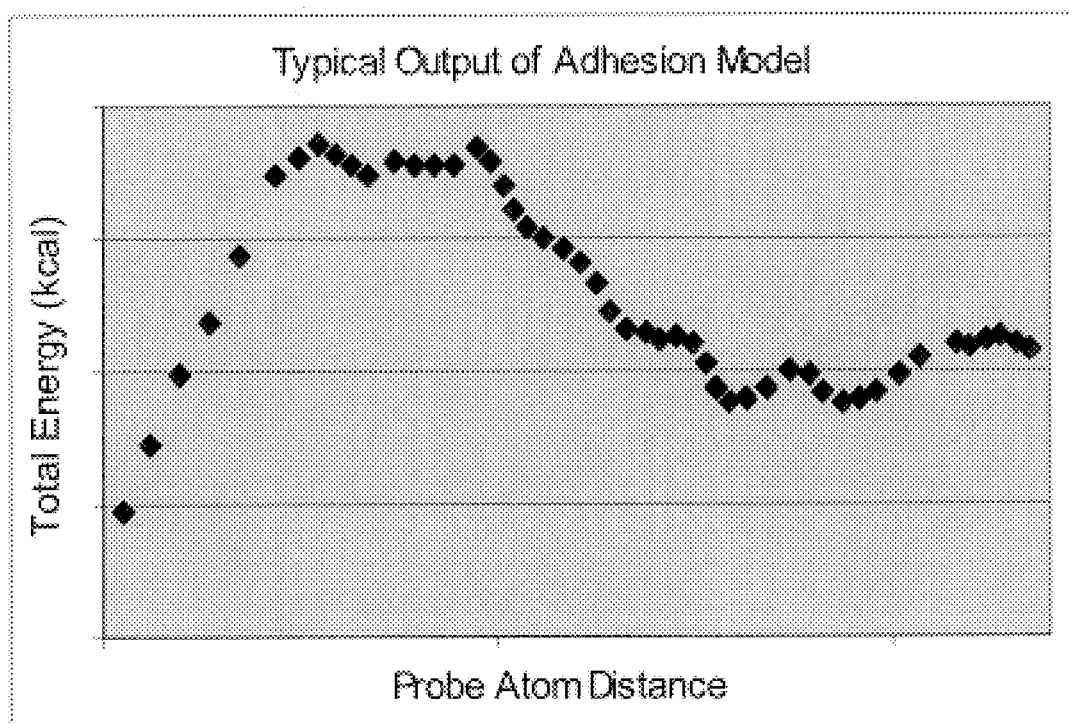
FIG. 17 is the energy trajectory of a typical molecular model of an adhesive interface.
Figure 18:
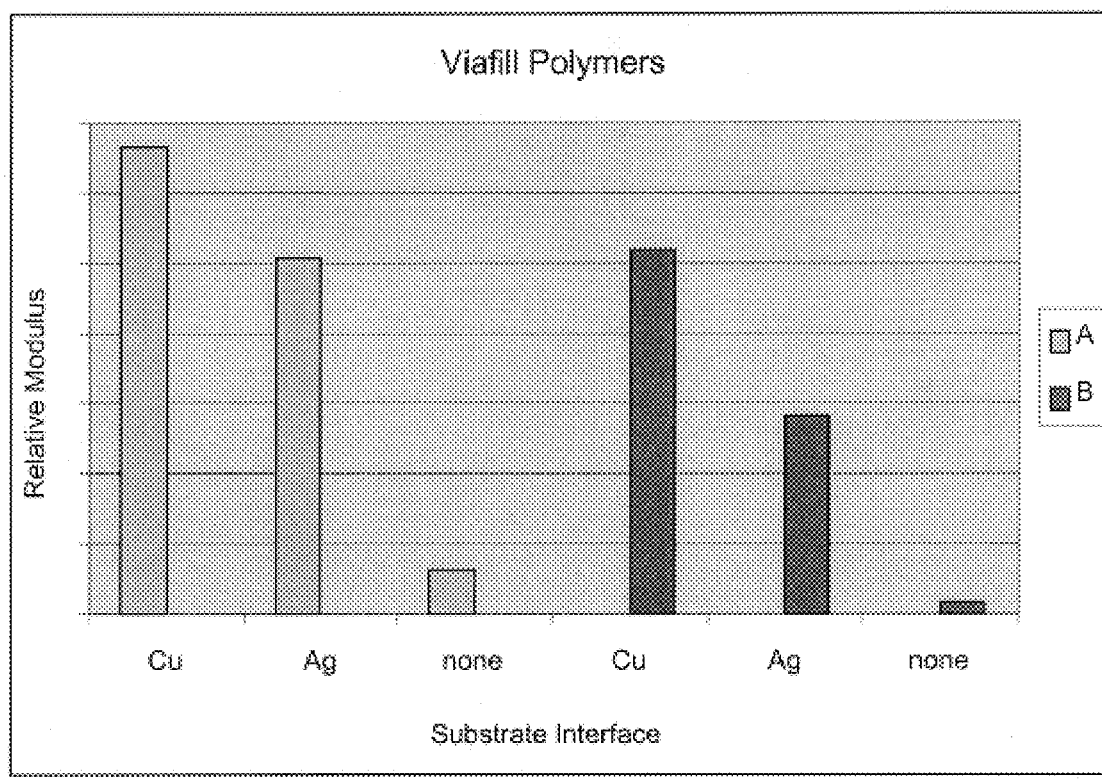
FIG. 18 shows the moduli estimated from molecular models indicating much higher values for the interfacial moduli (on "Cu" and "Ag") than predicted from the cohesive modulus alone (labeled as "none"). Polymer A is based on Bis A Epoxy, and Polymer B is based upon patent Ser. No. 09/133,507 ("Long and Short Chain Cycloaliphatic Epoxy Resins with Cyanate Ester") for the general formulation.
Figure 19:
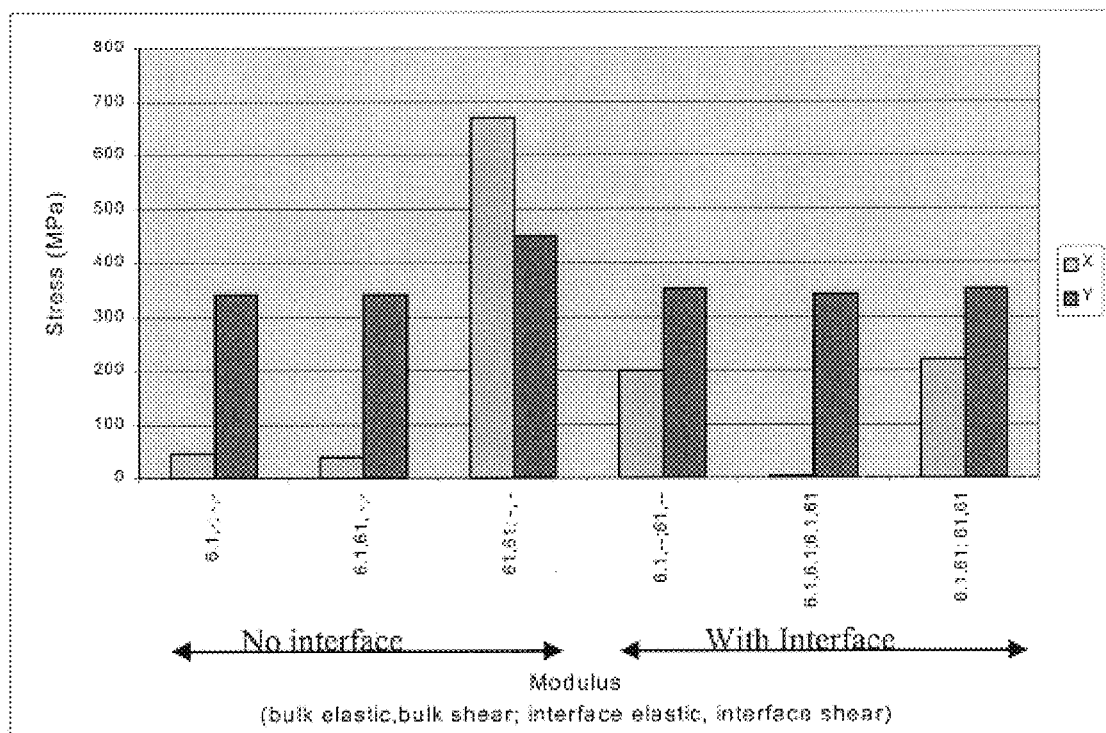
FIG. 19 shows a graphical comparison of the presence of FEA results showing stress difference with and without an interfacial layer. Note how the X-stress direction prediction varies widely without the presence of the interface. A, B, C, D labels on each bar represent the viafill elastic modulus, viafill shear modulus, interfacial layer elastic modulus, and interfacial layer shear modulus, respectively.

In general, results confirm that the elastic moduli for both the viafill and the board are important to the magnitudes of the stresses generated. This suggests that there will be a maximum modulus that the via configuration can withstand. As mentioned previously, using nominal properties for the viafill and board, the Cu stresses are low in the forward analysis direction, and no failure is predicted. However, in the reverse direction, much higher compressive stresses are generated overall using nominal properties, and failure is predicted on the Cu walls (barrel failure). For the forward direction top/bottom Cu failure (X) is predicted to occur before side-wall (Y) Cu failure with increasing viafill modulus; however for the reverse direction wall (Y) failure is suggested to occur first with both top/bottom and wall failure occurring at high viafill moduli (FIG. 16). In addition, forward analysis (material expansion) only shows enough stress buildup for top/bottom Cu failure with very high moduli materials. By contrast, backward analysis (material shrinkage) indicates stresses high enough for sidewall (Y) or barrel failure using much lower modulus material properties than the forward direction. The shifting location of failure trends with analysis direction may point to process sensitivity and should be taken into consideration along with the material types. Generally higher Tg's (reflected in no drop in CTE at 500 K and/or no temperature dependence in the material properties) and introduction of room temperature dependent properties both appear to be secondary effects that help to reduce peak stress especially in cases above or near failure. Smaller stress can also be obtained if lower CTE's are used throughout the temperature range, starting with lower RT CTE's. Shear modulus shows a minor secondary affect, with the magnitude and location of the elastic and shear moduli affecting the balance of the top/bottom versus sidewall peak stresses. If high adhesion is introduced through use of a high modulus region next to the nominal properties, (Table 5 and FIG. 15B introduce a Cu/viafill interface region) lower peak stresses result than if the entire viafill area is defined with only high modulus properties. The results also suggest that a high modulus material next to the copper affects the top/bottom stress magnitudes the most, similar to the effect of introduction of a shear modulus however in this case placement of the component moduli are more targeted. This also suggests that the specific interfaces (including adhesive properties) can be important to the understanding of actual failure. Molecular modeling has shown in the past that the immediate vicinity of the interface is structurally different than the bulk material, in which structural reorientation and alignment of polymers on the surfaces of metals and inorganic substrates have produced a simulated adhesive modulus much higher than the polymer's modulus by itself, and so not obvious from evaluation of the bulk properties of the polymer. For instance the copper-polymer interface has been predicted to have a distinctly different modulus, usually higher, than the bulk polymer. This is shown in FIG. 18 in which two polymers have been molecularly modeled at a copper ("Cu") and silver ("Ag") interface and the relative adhesive moduli, as determined by the initial slopes of the derived energy to strain plot (FIG. 17) compared to the cohesive modulus ("none") derived by the same method. FIG. 18 demonstrates that the adhesive modulus is easily ten to twenty times larger than the polymer modulus. This consideration was used to model an "interfacial" region in the finite element model, where a maximum interfacial moduli used reflected a 10-fold increase over the polymer modulus used. The results are demonstrated in FIG. 19. Together with the FEA results it appears that the interfacial region should be considered another variable to failure, especially if high modulus is suspected as an interfacial property.

Via diameter was also reduced in the FEA study to 5×50 in a limited sample set; results suggest similar trends as noted for the 8×50 case (Table 6).

|  | Temperature Dependent Properties | | | | Temperature Independent Properties | | |
|---|---|---|---|---|---|---|---|
| Board Properties (RT elastic, RT shear) | 4,19 | 19,— | 19,19 | 95,95 | 19,— | 19,19 | 95,— |
| Forward Analysis (x, y stresses) | −82,21 | −10,57 | −10,58 | 26,120 | 30,−110 | 73,−9.7 | 8,120 |
| Backward Analysis (x, y stresses) | 51,−87 | 71,−240 | 72,−250 | −94,−500 | 72,−300 | 72,−300 | −40,−320 |

TABLE 2

Resulting Stresses (MPa) for Unfilled Vias.

| | Board-Temperature Independent | | | |
|---|---|---|---|---|
| Viafill | 4,19 | 19,— | 19,19 | 95,— |
| .6, 6.1 | 35,−17 | 61,−57 | 64,−59 | |
| .6,12.2 | 35,−17 | | | |
| .61,— | | 55,−57 | | |
| 6.1,— | 99,69 | 98,97 | 97,98 | |
| 6.1,—(50,50) | | 98,97 | | |
| 6.1,—(25,25) | | 1.8,75 | | |
| 6.1,6.1 | | 7.3,97 | 44,98 | 92,130 |
| 6.1,61 | | 57,97 | | |
| 19,—(temp indep) | | 44,84 | | |
| 31,31 | | 140,170 | | 140,150 |
| 61,— | | 360,210 | | |
| 61,61 | | 440,220 | | 450,200 |
| 61,61 (50,50) | | 360,210 | | 310,180 |

Properties are given in terms of "RT elastic modulus, RT shear modulus (RT CTE, hi T CTE)" in GPa.
CTE for viafill materials assumed to be 50 ppm (RT), 167 ppm (hi T) unless otherwise stated;
CTE for board material assumed to be 25 ppm (RT, 167 ppm (hi T) unless otherwise stated.

TABLE 3a

Resulting Stresses (MPa) For Forward Analysis
Temperature Independent Board Material Properties.

| | Board-Temperature Dependent | | | |
|---|---|---|---|---|
| Viafill | 4,19 | 19,— | 19,19 | 95,95 |
| .6,6.1 | 9.2,26 | 12,61 | 9.9,62 | 93,130 |
| .6,6.1 (50,50) | 8.9,26 | | 9.6,62 | |
| .6,12.2 | 37,−20 | | | |
| .61,— | 20,26 | | | |
| .61,.61 | 20,26 | | | |
| 1.2,6.1 | 17,30 | | | |
| 1.9,19 | 3,25 | | | |
| 3,6.1 | 56,44 | | | |
| 6.1,— | 99,69 | 97,88 | 96,89 | |
| 6.1,.61 | 80,76 | | | |
| 6.1,6.1 | 86,66 | 44,89 | 42,89 | 53,130 |
| 6.1,6.1 (50,50) | | | 42,89 | |
| 6.1,61 | | | 55,89 | 67,130 |
| 19,19 | | | 24,72 | |
| 31,31 | | | 140,170 | 140,150 |
| 61,61 | 430,250 | 440,230 | 300,230 | 450,200 |
| 61,61 (50,50) | | | 304,220 | 320,180 |

Properties are given in terms of "RT elastic modulus, RT shear modulus (RT CTE, hi T CTE)" in GPa.
CTE for viafill materials assumed to be 50 ppm (RT), 167 ppm (hi T) unless otherwise stated;
CTE for board material assumed to be 25 ppm (RT, 167 ppm (hi T) unless otherwise stated.

TABLE 3b

Resulting Stresses (MPa) For Forward Analysis
Temperature Dependent Properties for the Board Material.
Properties are given in terms of "RT elastic modulus, RT shear
modulus (RT CTE, hi T CTE)" in GPa.
CTE for viafill materials assumed to be 50 ppm (RT), 167 ppm(hi T) unless otherwise stated;
CTE for board material assumed to be 25 ppm (RT, 167 ppm (hi T) unless otherwise stated.

| | Temperature Dependent Board Properties | | | | | | Temperature Independent Board Properties | | | | |
|---|---|---|---|---|---|---|---|---|---|---|---|
| Viafill Properties | 4,19 | 19,— | 19,19 | 19,19,25 | 31,31 (50,50) | 95,95 | 4,19 | 19,— | 19,4 | 19,19 | 95,— |
| 0.6,.6.1 | 66,−95 | 70,−250 | | | | | | 74,−300 | | | |
| .61,31 | | | | | | | | 74,−300 | | | |
| .61,61 | | 100,250 | | | | | | 74,−300 | | | |
| 1.2,6.1 | 38,−100 | | | | | | | | | | |
| 6.1,— | −10,−160 | 39,−290 | 50,−290 | | | | 16,−170 | 45,−340 | 35,−330 | 55,−340 | |
| 6.1,—(50) | | | | | | | | 45,−340 | | | |
| 61,—(25,25) | | | | | | | | 59,−320 | | | |
| 6.1,6.1 | 2.8,−160 | 44,−290 | 55,−295 | | 120,−540 | −120,−320 | | 50,−340 | | | −134,−320 |
| 6.1,61 | | −51,−290 | −35,−294 | | | −110,−510 | | −40,−340 | | | |
| 19,— temp indep | | −150,−320 | | | | | | −220,−360 | | | |
| 19,19 | | | −61,−310 | | −66,−530 | | | | | | |
| 31,31 | | | −310,−320 | | −390,−590 | −320,−340 | | −302,−338 | | | −310,−530 |
| 61,— | | | | | | | | −670,−450 | | | |
| 61,61 | −690,−420 | −680,−450 | −410,−350 | | | | | −670,−450 | | | |
| 61,61,50 | | | −310,−320 | −420,−360 | | | | −420,−370 | | | |

TABLE 4

Resulting Stresses (MPa) For Backward Analysis.

| Viafill | Forward Analysis Board Properties | |
|---|---|---|
| | 19,19 | 19,— |
| 0.6,6.1; 6.1,6.1 | 39,66 | |
| 0.6,6.1; 6.1,61 | | 39,77 |
| 0.6,6.1; 61,61 | | 110,120 |
| 6.1,61; 61,61 | 130,250 | 140,130 |

| Viafill | Backward Analysis Board Properties Temperature Independent | | Temp Dependent |
|---|---|---|---|
| | 19,19 | 19,— | 19,— |
| 0.61,0.61; 0.61,61 | | 110,−300 | 110,−250 |
| 0.61,0.61; 6.1,61 | | 60,−310 | |
| 0.6,6.1; 6.1,61 | | 59,−310 | |
| 0.6,6.1; 61,61 | | −83,−320 | |
| 6.1,—; 61,— | | −200,−350 | |
| 6.1,6.1; 6.1,61 | | 4.8,−340 | |
| 6.1,61; 61,61 | −130,−310 | −220,−350 | −140,−310 |

Properties are given in terms of "RT elastic modulus,RT shear modulus (RT CTE, hi T CTE)" in GPa.
CTE for viafill materials assumed to be 50 ppm (RT), 167 ppm (Hi T) unless otherwise stated;
CTE for board material assumed to be 25 ppm (RT, 167 ppm (hi T) unless otherwise stated.

TABLE 5

Resulting Stresses (MPa) Using Interface Viafill Properties (FIG. 15b).

| Viafill | Forward Analysis Board | | | Backward Analysis Board | | |
|---|---|---|---|---|---|---|
| | 4,19 temp dependent | 19,19 temp dependent | 19,— temp indep | 4,19 temp dependent | 19,19 temp dependent | 19,— temp indep |
| .61,— | | | | 2.3,18 | | |
| 6,6.1 | −33,26 | | | 61,−100 | | |
| 6.1,— | | 58,80 | 68,89 | | 130,−290 | 130,−330 |
| 6.1,6.1 | | 21,80 | 52,89 | | 120,−290 | 52,−330 |
| 61,61 | | 310,180 | 302,220 | | −310,−380 | −310,−410 |

Properties for board are given in terms of "RT elastic modulus, RT shear modulus (RT CTE, hi T CTE)"
Properties for viafill are given in terms of "viafill bulk; interface zone" in GPa Table 6 Resulting Stresses (MPa) in a 5×50 via.

Properties are given in terms of "RT elastic modulus, RT shear modulus (RT CTE, hi T CTE)" in GPa
CTE for viafill materials assumed to be 50 ppm (RT), 167 ppm(hi T) unless otherwise stated;
CTE for board material assumed to be 25 ppm (RT, 167 ppm (hi T) unless otherwise stated.

Thus, specific embodiments and uses of models and methods of integrating simulation techniques for advanced material predictive analysis material predictive analysis have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of designing an electronic component comprising:

modeling a first material with respect to a characteristic of the first material in a sufficient detail to at least partially account for a first value for the characteristic;

modeling a second material with respect to a characteristic of the second material in a sufficient detail to at least partially account for a second value for the characteristic; and modeling an interface between the first material and the second material such that in at least some instances the characteristic of the interface does not have an expected characteristic or an expected value of between the first value and the second value; and generating a set of evaluation data from the modeling of the interface.

2. The method of claim 1, wherein the first material is a polymer.

3. The method of claim 1, wherein the second material is a substrate.

4. The method of claim 1, wherein the first value and the second value are represented in engineering units.

5. The method of claim 1, wherein the first value and the second value are represented in standard chemical units.

6. The method of claim 1, wherein the characteristic is used to determine material properties and structural configurations used for a standard finite element analysis.

7. The method of claim 1, wherein the characteristic is relative adhesive ability.

8. The method of claim 1 wherein the characteristic is a repetitive strain cycle.

9. The method of claim 8, wherein the repetitive strain cycle characterizes relative lifetime performance ability.

10. The method of claim 7, wherein the characteristic is modeled under additional thermal or moisture stress.

11. The method of claim 1, wherein the characteristic is cohesive ability.

12. The method of claim 1, wherein the characteristic is relative adhesive modulus.

13. The method of claim 1, wherein the characteristic is relative cohesive modulus.

14. The method of claim 1, wherein the interface comprises similar bulk materials.

15. The method of claim 1 further comprising manipulating the set of evaluation data such that the set is represented in engineering units.

16. A software code that executes the method of claim 1.

17. A modeling system comprising:

a computer;

an output device operatively coupled to the computer that outputs a set of evaluation data;

a plurality of sets of controls coupled to the computer; and a software code that models a first material with respect to a characteristic of the first material in a sufficient detail to at least partially account for a first value for the characteristic; models a second material with respect to a characteristic of the second material in a sufficient detail to at least partially account for a second value for the characteristic; models an interface between the first material and the second material such that in at least some instances the characteristic of the interface does not have a value of between the first value and the second value; and generates the set of evaluation data from the modeling of the interface, wherein the code is run by the computer and is coupled to the controls and to the output device.

18. The modeling system of claim 17, wherein the output device is a video monitor.

19. The modeling system of claim 17, wherein the plurality of sets of controls comprises at least one of a keyboard, a computer mouse, a microphone, a touch-screen device, a coaxial cable, or an infrared device.

* * * * *